(12) United States Patent
Nakamura et al.

(10) Patent No.: US 9,264,638 B2
(45) Date of Patent: Feb. 16, 2016

(54) ZOOM LENS AND IMAGE PICKUP APPARATUS INCLUDING THE SAME

(71) Applicant: CANON KABUSHIKI KAISHA, Tokyo (JP)

(72) Inventors: Tomoyuki Nakamura, Utsunomiya (JP); Kazuya Shimomura, Utsunomiya (JP); Tsuyoshi Wakazono, Utsunomiya (JP); Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/534,550

(22) Filed: Nov. 6, 2014

(65) Prior Publication Data

US 2015/0130969 A1    May 14, 2015

(30) Foreign Application Priority Data

Nov. 12, 2013   (JP) .................. 2013-234390

(51) Int. Cl.
  *G02B 15/14*   (2006.01)
  *H04N 5/369*   (2011.01)
  *H04N 5/232*   (2006.01)
  *G02B 15/177*  (2006.01)

(52) U.S. Cl.
  CPC ............ *H04N 5/369* (2013.01); *G02B 15/14* (2013.01); *G02B 15/177* (2013.01); *H04N 5/23296* (2013.01)

(58) Field of Classification Search
  CPC ...... G02B 15/14; G02B 15/16; G02B 15/173; G02B 15/20; G02B 15/24; G02B 15/28
  USPC .................................................. 359/686–690
  See application file for complete search history.

(56) References Cited

U.S. PATENT DOCUMENTS 6,512,637 B1 * 1/2003 Tomita ................. G02B 15/173
                                                  359/684

FOREIGN PATENT DOCUMENTS

JP    H09-015501 A    1/1997
JP    2004-341237 A   12/2004

* cited by examiner

*Primary Examiner* — William Choi
(74) *Attorney, Agent, or Firm* — Carter, DeLuca, Farrell & Schmidt, LLP

(57) ABSTRACT

A zoom lens includes in order from object side to image side: a positive first lens unit that does not move for zooming; a negative second lens unit that moves during zooming; and a positive N-th lens unit that does not move for zooming, the N-th lens unit being arranged closest to the image side. The first lens unit includes, in order from object side to image side: a negative first sub-lens unit that does not move for focusing; a positive second sub-lens unit that moves along an optical axis during focusing; and a positive third sub-lens unit that does not move for focusing. Focal length of the first lens unit, focal length at wide angle end of the zoom lens, and lateral magnification at wide angle end satisfy predetermined conditions.

6 Claims, 13 Drawing Sheets

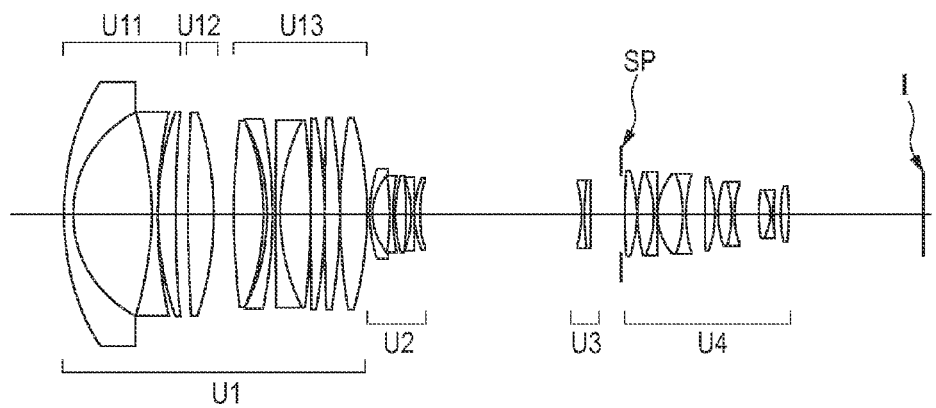
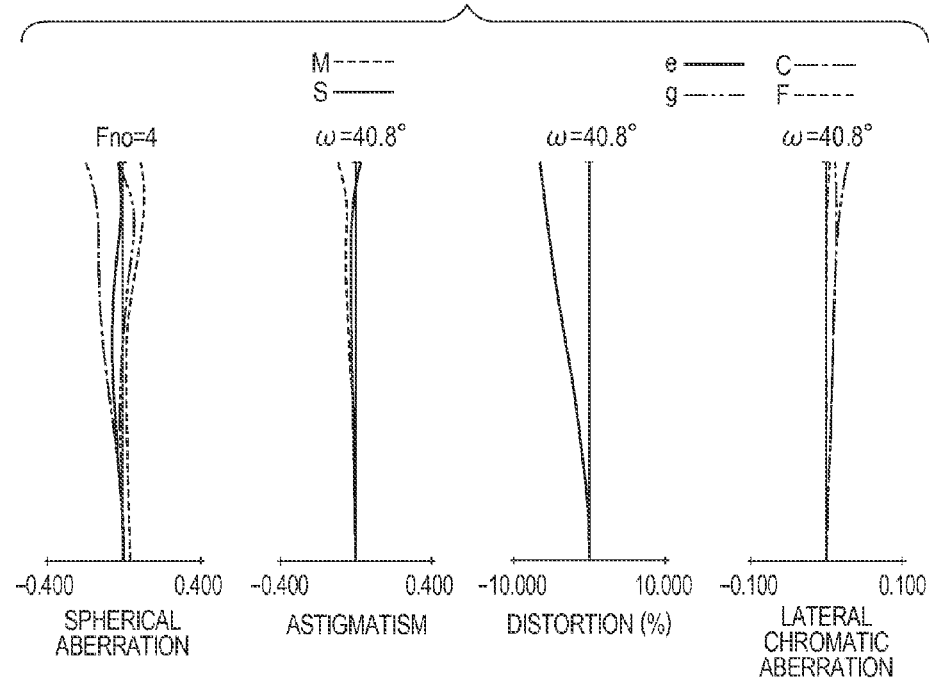

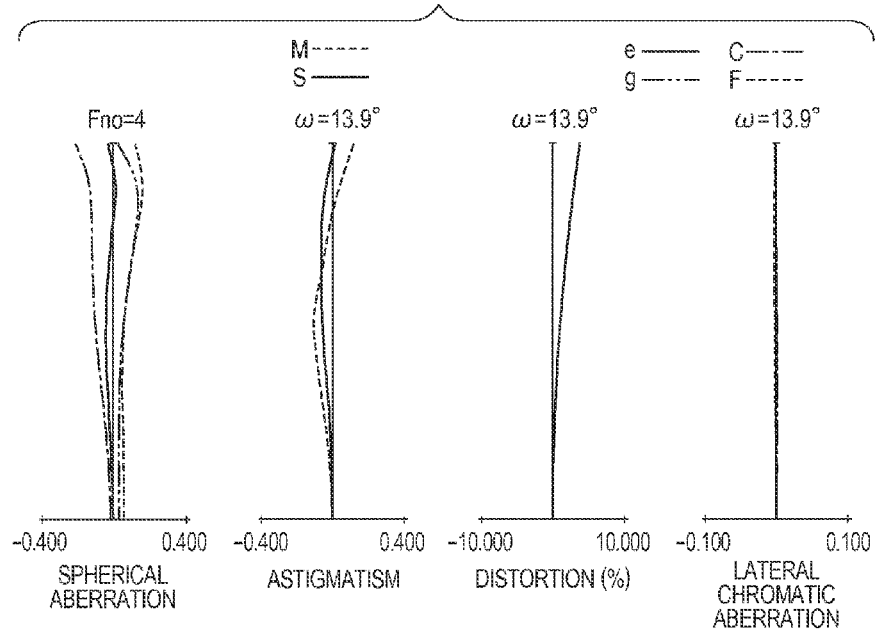
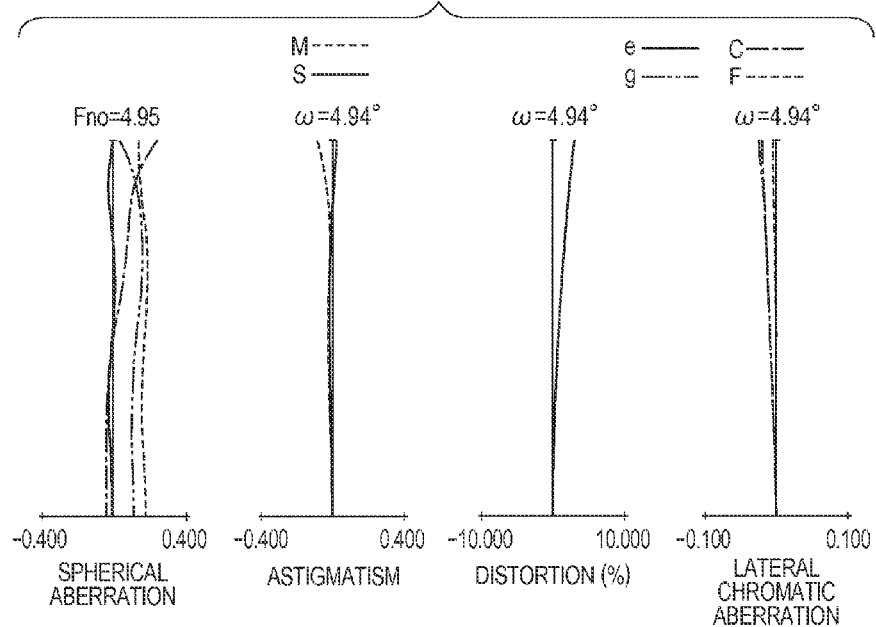

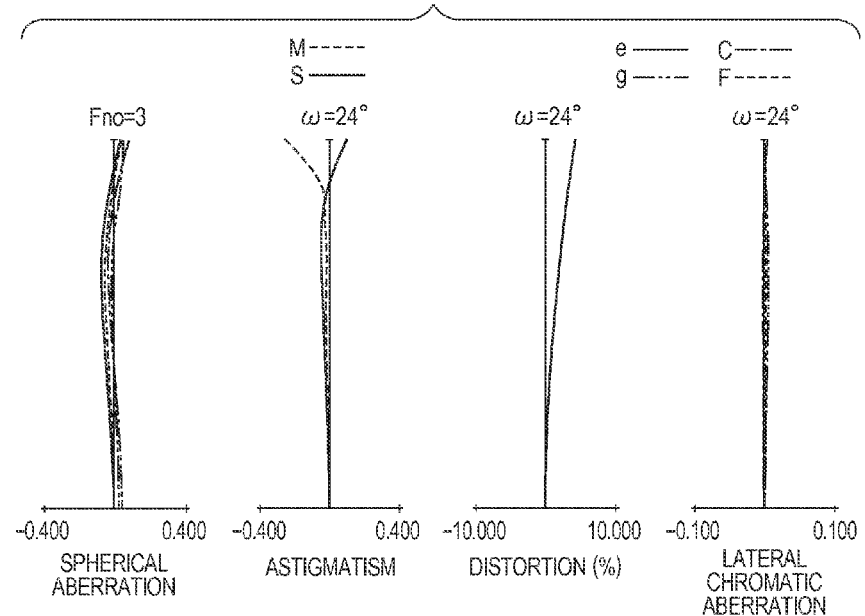
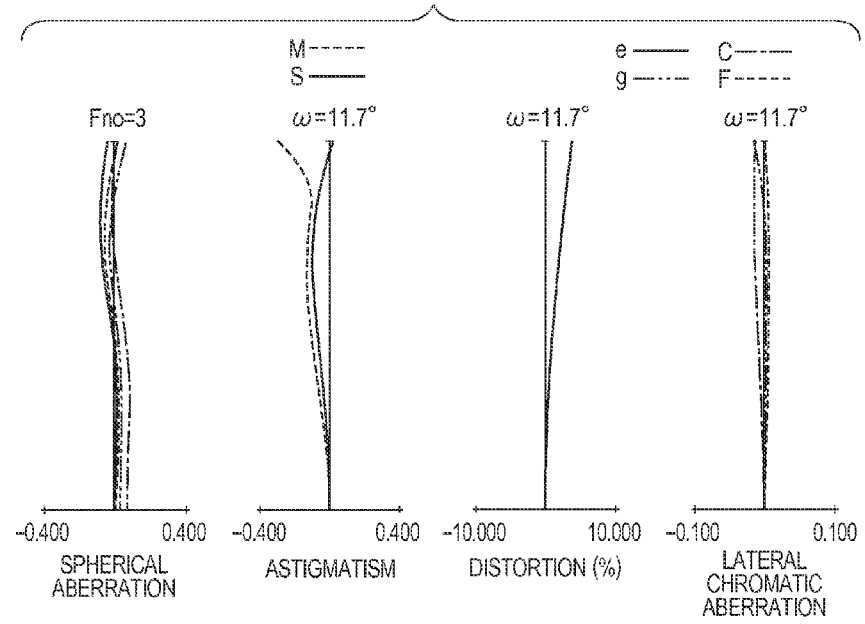

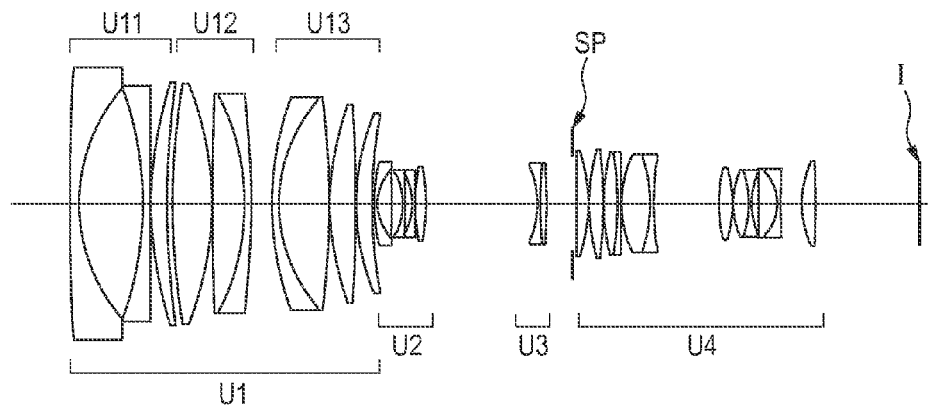
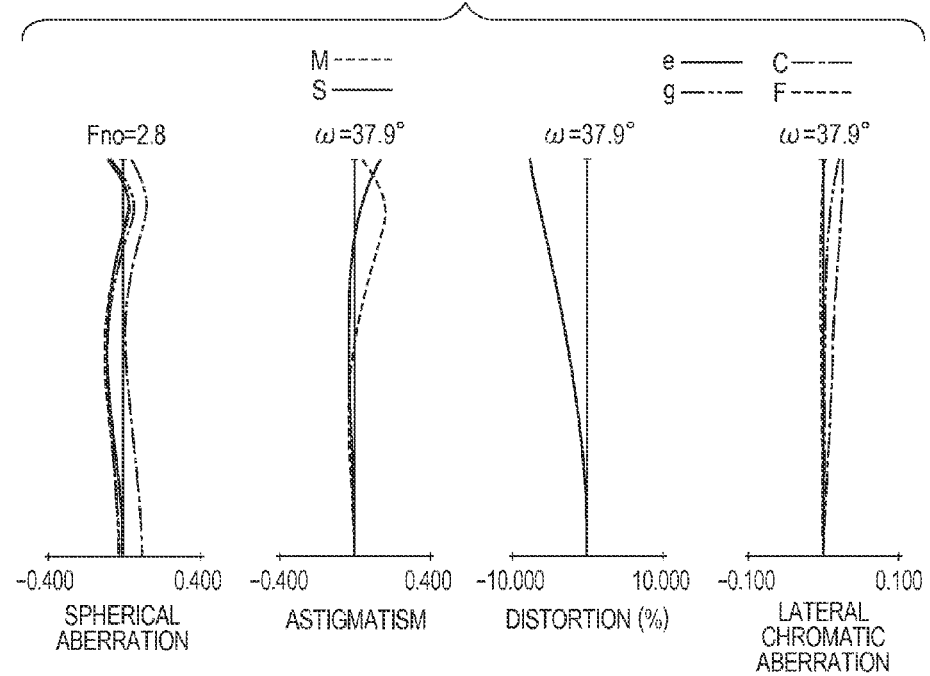

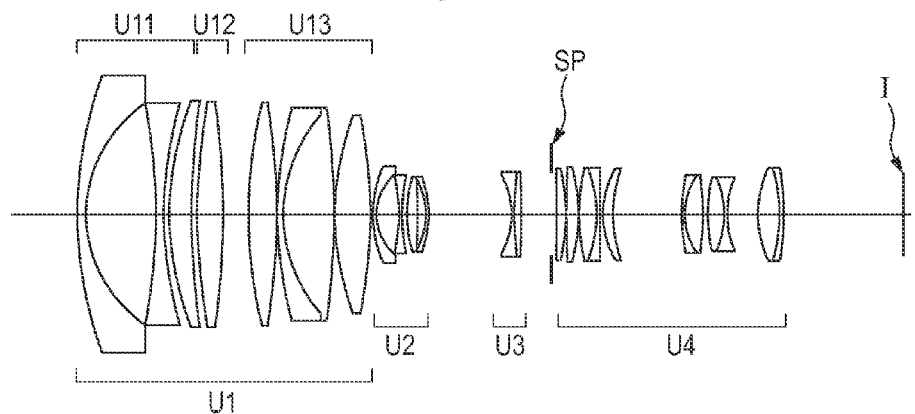
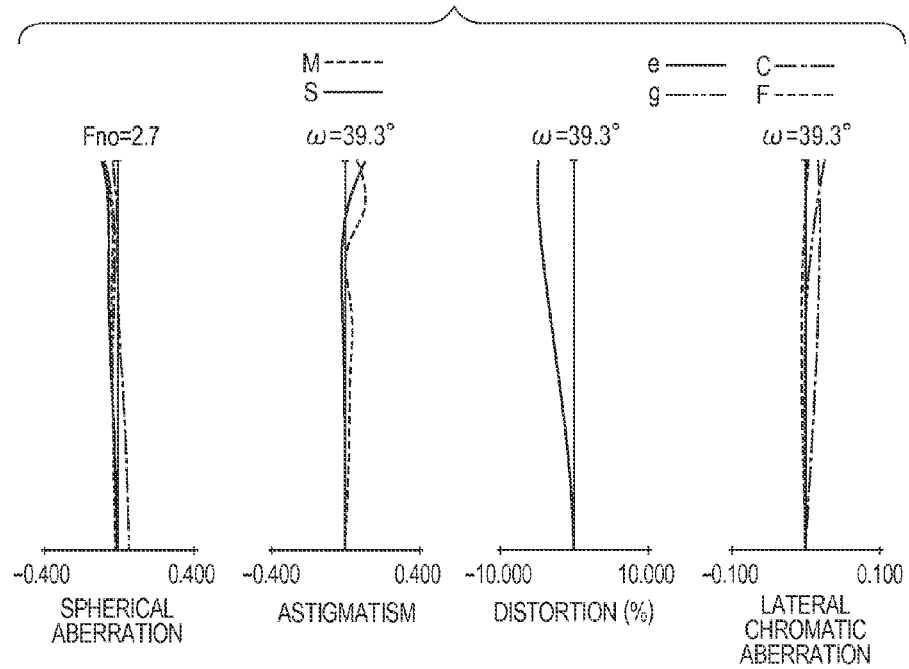

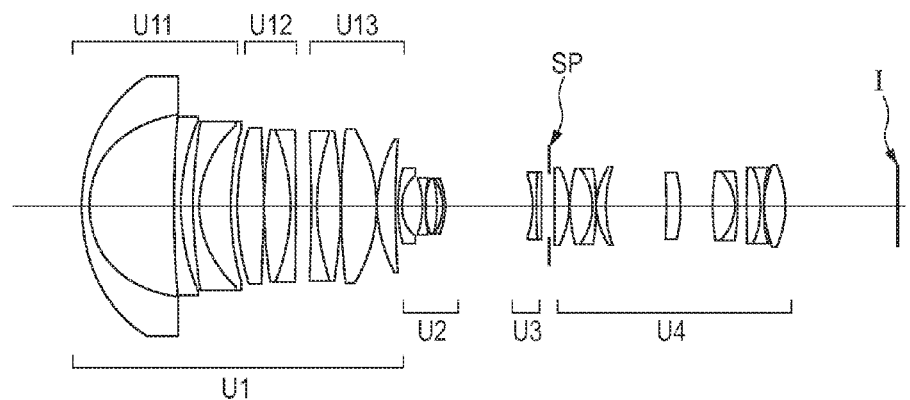
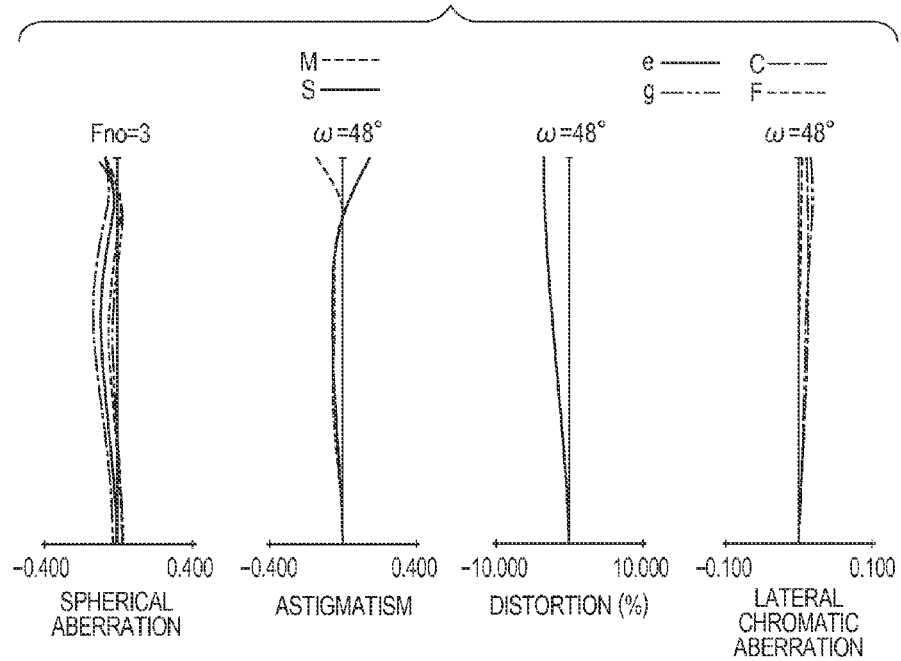

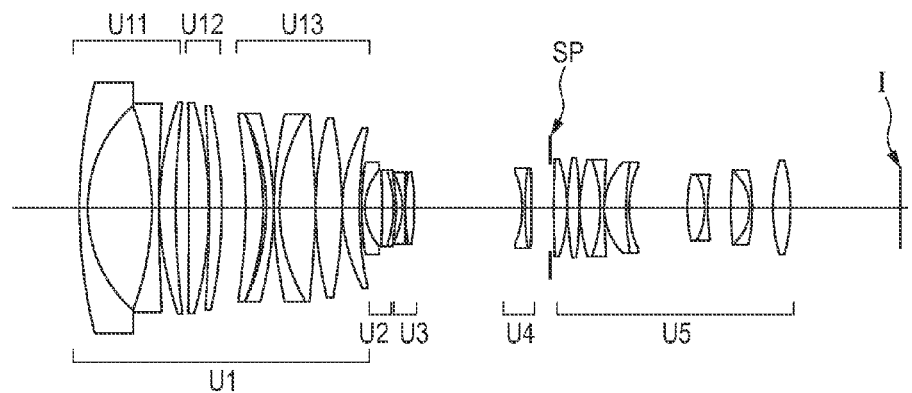
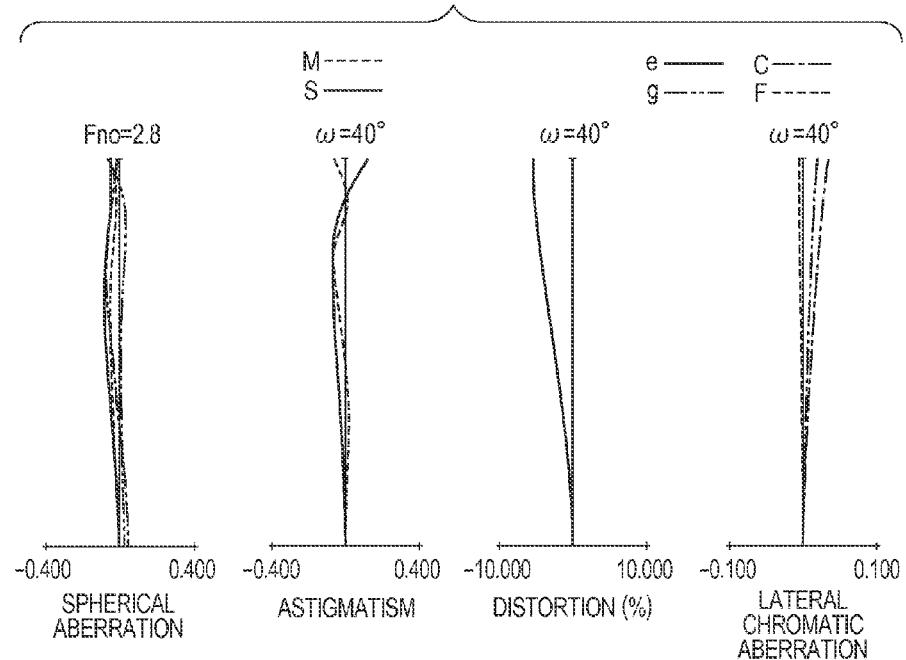

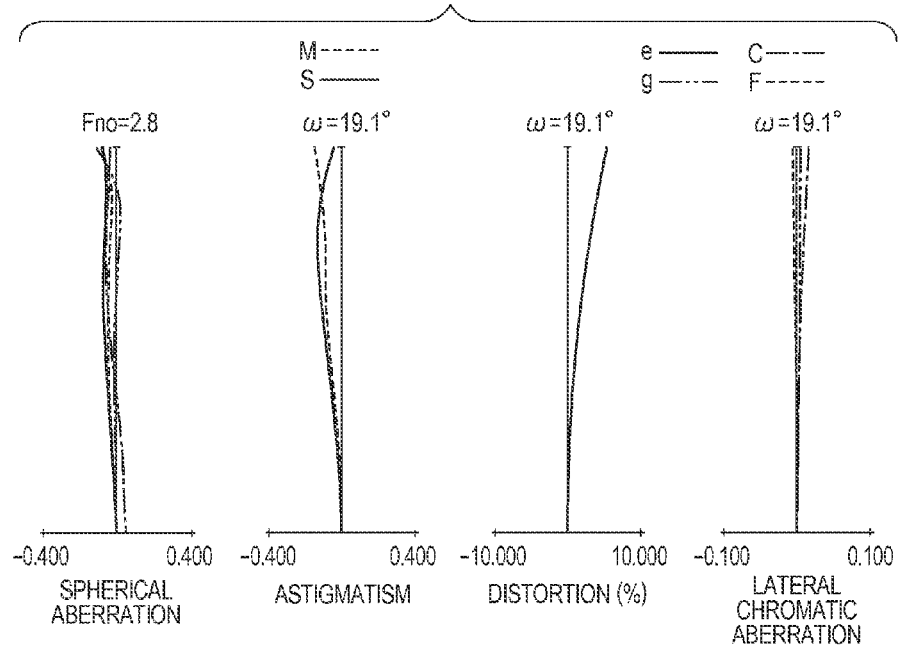
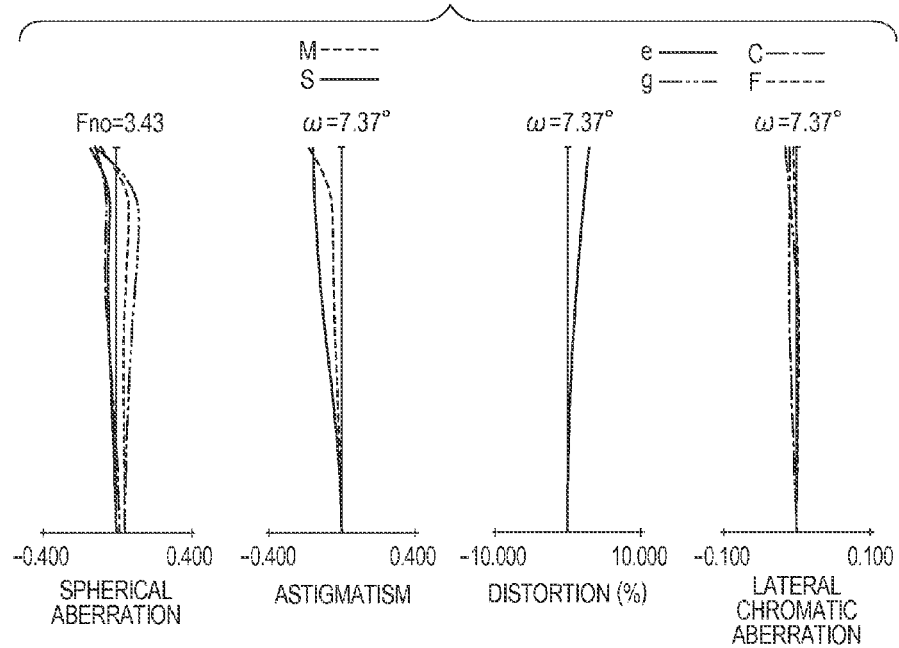

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a broadcasting television camera, a movie camera, a video camera, a digital still camera, a monitoring camera, and a silver-halide film camera, for example.

2. Description of the Related Art

In recent years, a zoom lens having a wide angle of field, a high zoom ratio, and high optical performance is required for an image pickup apparatus such as a television camera, a movie camera, a silver-halide film camera, a digital camera, or a video camera. There has been known, as a zoom lens having a wide angle of field and a high zoom ratio, a four-unit zoom lens including a first lens unit having a positive refractive power, a second lens unit having a negative refractive power that is used for zooming, a third lens unit having a negative refractive power that is used to correct image plane variation accompanying zooming, and a fourth lens unit having a positive refractive power that is used for image formation (Japanese Patent Application Laid-Open Nos. H09-015501 and 2004-341237).

In Japanese Patent Application Laid-Open No. H09-015501, there is disclosed a zoom lens having a zoom ratio of approximately 8 and a field angle of photography at a wide angle end of approximately 87°. In Japanese Patent Application Laid-Open No. 2004-341237, there is disclosed a zoom lens having a zoom ratio of approximately 2.9 and a field angle of photography (an angular field of view) at a wide angle end of approximately 94°.

In the four-unit zoom lens having the structure described above, it is relatively easy to achieve the increased wide angle of field. However, in order to achieve both the high optical performance and the reduction in size of the four-unit zoom lens, it is important to appropriately set the arrangement of the refractive powers of the lenses. In particular, in the lens unit closest to an object side, an off-axis ray passes through a position farthest from the optical axis. Therefore, in order to achieve both the high optical performance and the reduction in size, it is important to appropriately set the refractive power and the structure of the lens unit closest to the object side. In addition, the lens unit closest to the image side plays a role of determining sizes of all lenses closer to the object side than the lens unit. Therefore, in order to achieve both the high optical performance and the reduction in size, it is important to appropriately set the lateral magnification of the lens unit closest to the image side. Unless those conditions are approximately set, it becomes difficult to obtain the zoom lens having the wide angle of field, the high zoom ratio, and the high optical performance over the entire zoom range.

The zoom lens disclosed in each of Japanese Patent Application Laid-Open Nos. H09-015501 and 2004-341237 is assumed to be applied to a relatively small image pickup element for a television camera. When the zoom lens is applied to an image pickup element that has been increased in size in recent years, the lens is also increased in size in proportion to the enlargement of the image pickup element.

SUMMARY OF THE INVENTION

The present invention provides a zoom lens having a wide angle of field, a high zoom ratio, high optical performance over an entire zoom range, and good zoom action, and provides an image pickup apparatus including the zoom lens.

According to one embodiment of the present invention, there is provided a zoom lens, including, in order from an object side to an image side: a first lens unit having a positive refractive power that does not move for zooming; a second lens unit having a negative refractive power that moves during zooming; and an N-th lens unit having a positive refractive power that does not move for zooming, the n-th lens unit being arranged closest to the image side, in which the first lens unit includes, in order from the object side to the image side: a first sub-lens unit having a negative refractive power that does not move for focusing; a second sub-lens unit having a positive refractive power that moves along an optical axis during focusing; and a third sub-lens unit having a positive refractive power that does not move for focusing, and the following conditional expressions are satisfied:

$$1.5 < f1/fw < 3.5; \text{ and}$$

$$-2.70 < \beta nw < -1.45,$$

where $f1$ represents a focal length of the first lens unit, $fw$ represents a focal length at a wide angle end of the zoom lens, and $\beta nw$ represents a lateral magnification at a wide angle end.

According to one embodiment of the present invention, it is possible to provide the zoom lens having a wide angle of field, a high zoom ratio, and high optical performance over the entire zoom range, and to provide the image pickup apparatus including the zoom lens.

Further features of the present invention will become apparent from the following description of exemplary embodiments with reference to the attached drawings.

BRIEF DESCRIPTION OF THE DRAWINGS

FIG. 1 is a lens cross-sectional view when focusing on an infinite object at a wide angle end according to Numerical Embodiment 1 of the present invention.

FIG. 2A is an aberration diagram when focusing on an infinite object at the wide angle end according to Numerical Embodiment 1.

FIG. 2B is an aberration diagram when focusing on an infinite object at an intermediate zoom position according to Numerical Embodiment 1.

FIG. 2C is an aberration diagram when focusing on an infinite object at a telephoto end according to Numerical Embodiment 1.

FIG. 4B is an aberration diagram when focusing on an infinite object at the intermediate zoom position according to Numerical Embodiment 2.

FIG. 4C is an aberration diagram when focusing on an infinite object at the telephoto end according to Numerical Embodiment 2.

FIG. 5 is a lens cross-sectional view when focusing on an infinite object at the wide angle end according to Numerical Embodiment 3 of the present invention.

FIG. 6A is an aberration diagram when focusing on an infinite object at the wide angle end according to Numerical Embodiment 3.

FIG. 7 is a lens cross-sectional view when focusing on an infinite object at the wide angle end according to Numerical Embodiment 4 of the present invention.

FIG. 8A is an aberration diagram when focusing on an infinite object at the wide angle end according to Numerical Embodiment 4.

FIG. 9 is a lens cross-sectional view when focusing on an infinite object at the wide angle end according to Numerical Embodiment 5 of the present invention.

FIG. 10A is an aberration diagram when focusing on an infinite object at the wide angle end according to Numerical Embodiment 5.

FIG. 11 is a lens cross-sectional view when focusing on an infinite object at the wide angle end according to Numerical Embodiment 6 of the present invention.

FIG. 12A is an aberration diagram when focusing on an infinite object at the wide angle end according to Numerical Embodiment 6.

FIG. 12B is an aberration diagram when focusing on an infinite object at the intermediate zoom position according to Numerical Embodiment 6.

FIG. 12C is an aberration diagram when focusing on an infinite object at the telephoto end according to Numerical Embodiment 6.

DESCRIPTION OF THE EMBODIMENT

Now, an embodiment of the present invention is described in detail with reference to the attached drawings. A zoom lens according to each of Embodiments 1 to 5 of the present invention includes, in order from an object side to an image side: a first lens unit having a positive refractive power that does not move for zooming; a second lens unit having a negative refractive power that moves during zooming; a third lens unit having a negative refractive power that moves during zooming; and a fourth lens unit having a positive refractive power that does not move for zooming.

A zoom lens according to Embodiment 6 of the present invention includes, in order from an object side to an image side: a first lens unit having a positive refractive power that does not move for zooming; a second lens unit having a negative refractive power that moves during zooming; a third lens unit having a negative refractive power that moves during zooming; a fourth lens unit having a negative refractive power that moves during zooming; and a fifth lens unit having a positive refractive power that does not move for zooming.

The expression that "a lens unit does not move for zooming" means herein that the lens unit is not driven for a purpose of zooming, but the lens unit may move for focusing during zooming if zooming and focusing are performed simultaneously.

FIG. 1 is a lens cross-sectional view of a zoom lens according to Embodiment 1 (Numerical Embodiment 1) of the present invention when focusing on an infinite object at a wide angle end (focal length f=18.00 nm). FIGS. 2A, 2B, and 2C are aberration diagrams respectively at the wide angle end, at an intermediate zoom position (focal length f=63.00 mm), and at a telephoto end (focal length f=180.00 mm) when focusing on an infinite object according to Numerical Embodiment 1. Here, the focal length is a value of this numerical embodiment expressed in millimeters. The same is true for the following embodiments.

Figure 3:
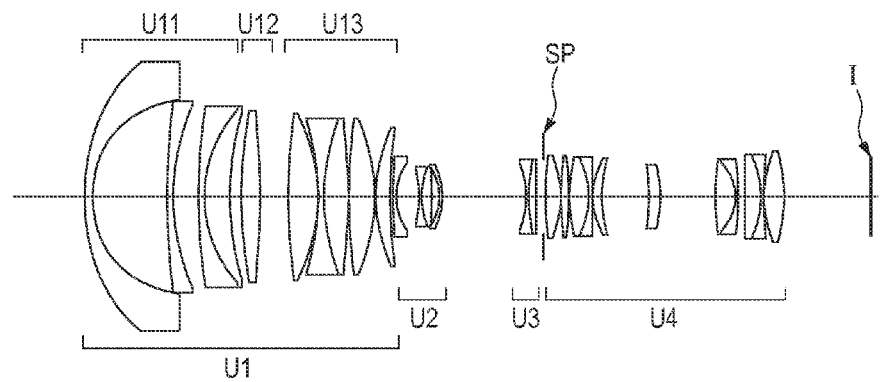
FIG. 3 is a lens cross-sectional view when focusing on an infinite object at the wide angle end according to Numerical Embodiment 2 of the present invention.
Figure 4A:
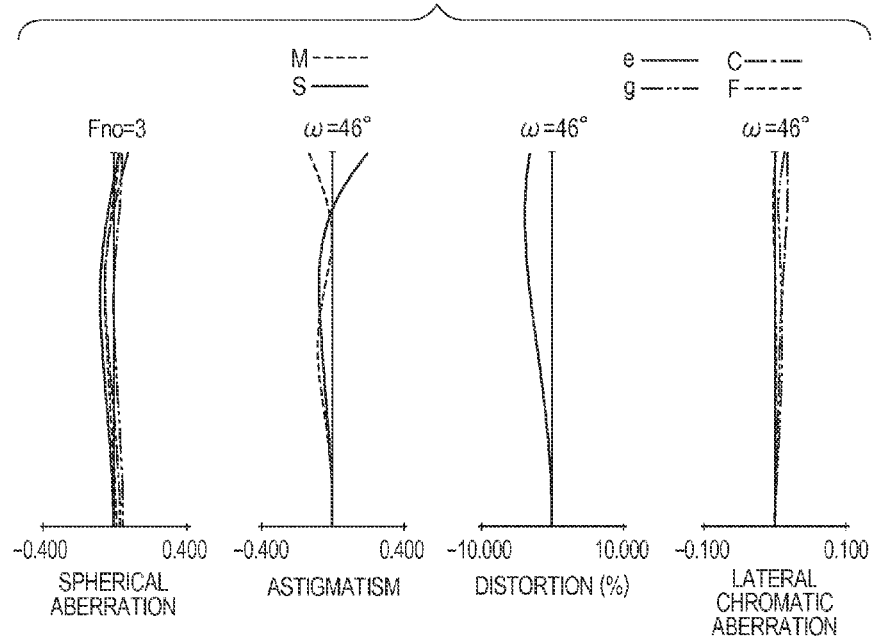
FIG. 4A is an aberration diagram when focusing on an infinite object at the wide angle end according to Numerical Embodiment 2.

FIG. 3 is a lens cross-sectional view of a zoom lens according to Embodiment 2 (Numerical Embodiment 2) of the present invention at a wide angle end (focal length f=15.00 mm) when focusing on an infinite object. FIGS. 4A, 4B, and 4C are aberration diagrams respectively at the wide angle end, at an intermediate zoom position (focal length f=35.00 mm), and at a telephoto end (focal length f=75.00 mm) when focusing on an infinite object according to Numerical Embodiment 2.

Figure 6B:
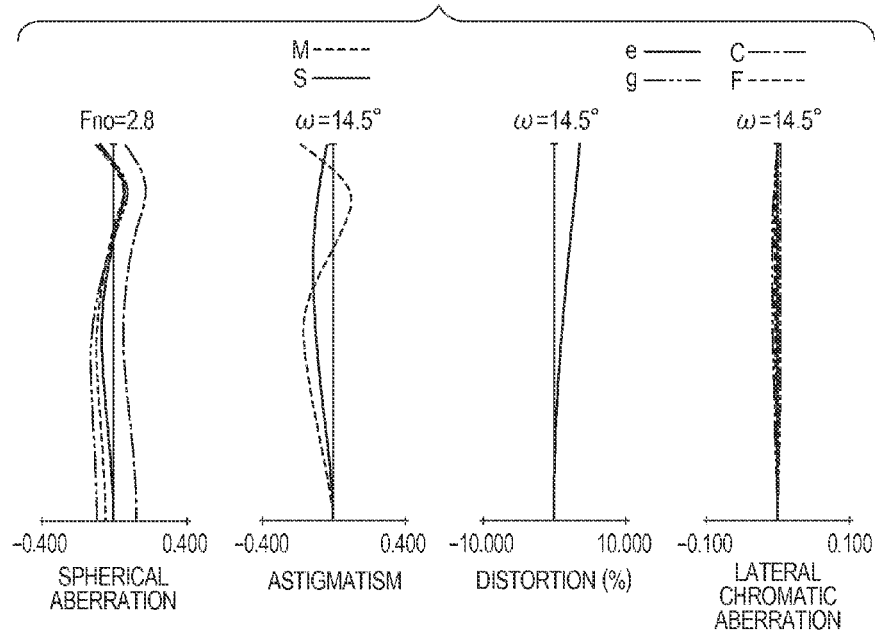
FIG. 6B is an aberration diagram when focusing on an infinite object at the intermediate zoom position according to Numerical Embodiment 3.
Figure 6C:
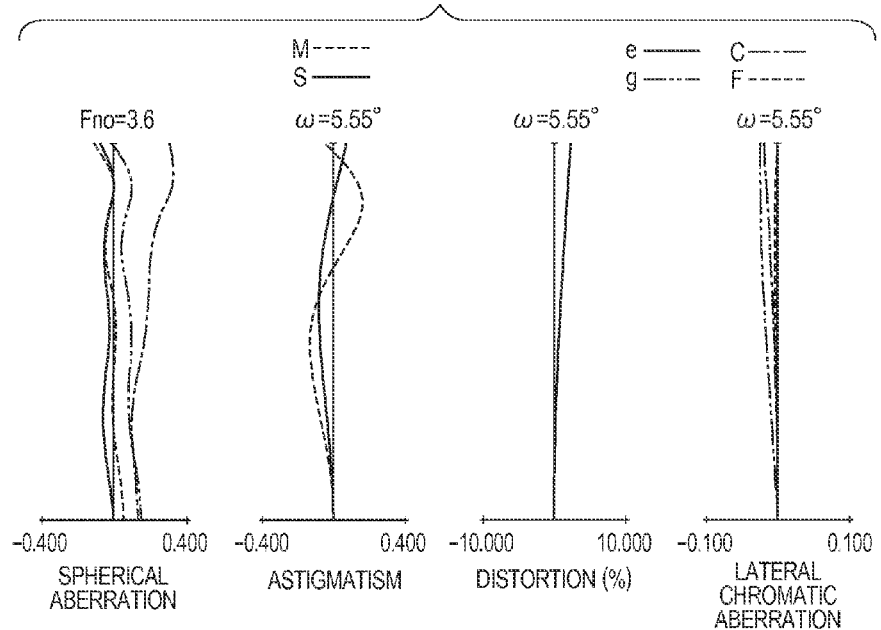
FIG. 6C is an aberration diagram when focusing on an infinite object at the telephoto end according to Numerical Embodiment 3.

FIG. 5 is a lens cross-sectional view of a zoom lens according to Embodiment 3 (Numerical Embodiment 3) of the present invention at a wide angle end (focal length f=20.00 mm) when focusing on an infinite object. FIGS. 6A, 6B, and 6C are aberration diagrams respectively at the wide angle end, at an intermediate zoom position (focal length f=60.00 mm), and at a telephoto end (focal length f=160.00 mm) when focusing on an infinite object according to Numerical Embodiment 3.

Figure 8B:
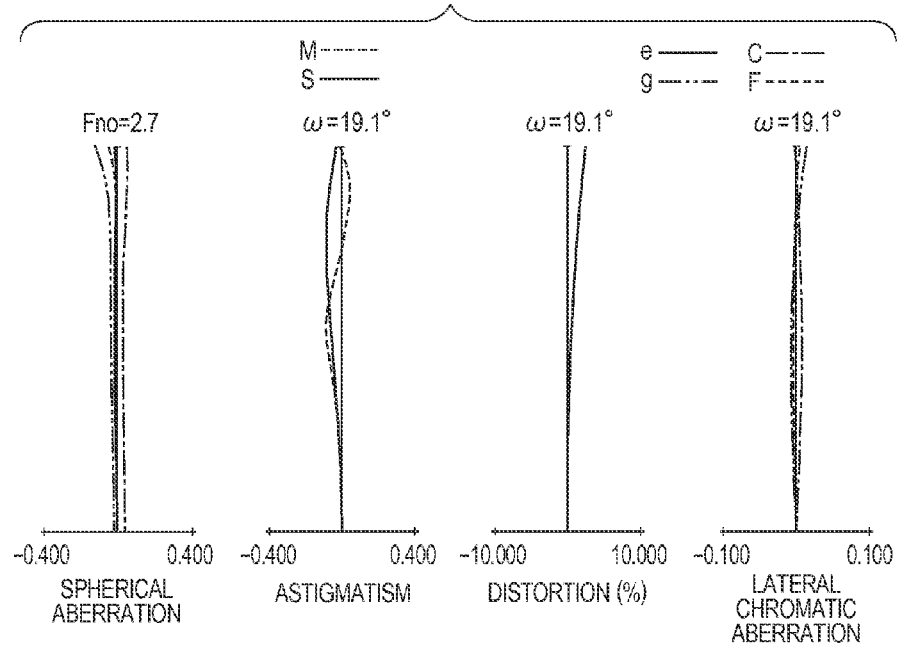
FIG. 8B is an aberration diagram when focusing on an infinite object at the intermediate zoom position according to Numerical Embodiment 4.
Figure 8C:
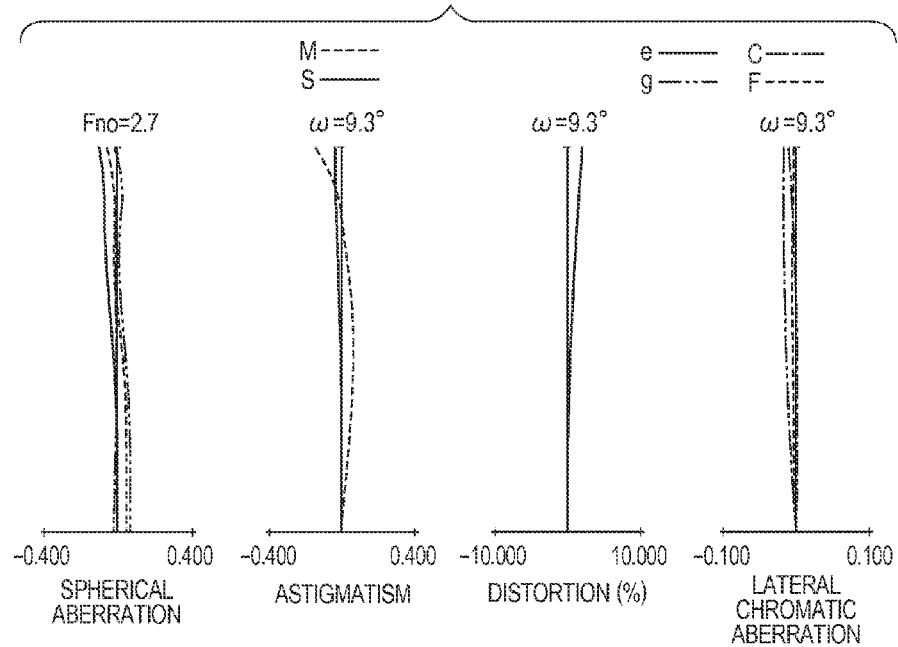
FIG. 8C is an aberration diagram when focusing on an infinite object at the telephoto end according to Numerical Embodiment 4.

FIG. 7 is a lens cross-sectional view of a zoom lens according to Embodiment 4 (Numerical Embodiment 4) of the present invention at a wide angle end (focal length f=19.00 mm) when focusing on an infinite object. FIGS. 8A, 8B, and 8C are aberration diagrams respectively at the wide angle end, at an intermediate zoom position (focal length f=45.00 mm), and at a telephoto end (f=95.00 mm) when focusing on an infinite object according to Numerical Embodiment 4.

Figure 10B:
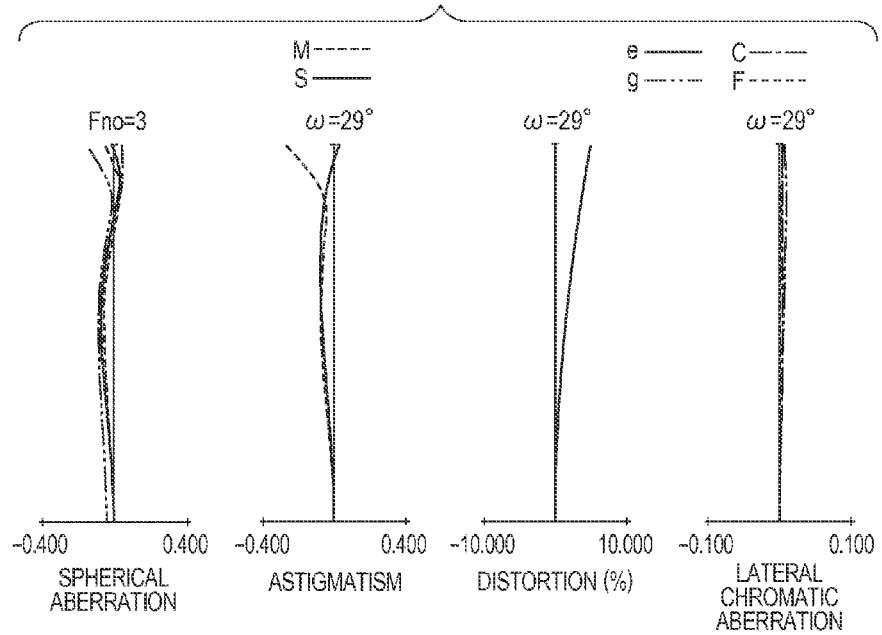
FIG. 10B is an aberration diagram when focusing on an infinite object at the intermediate zoom position according to Numerical Embodiment 5.
Figure 10C:
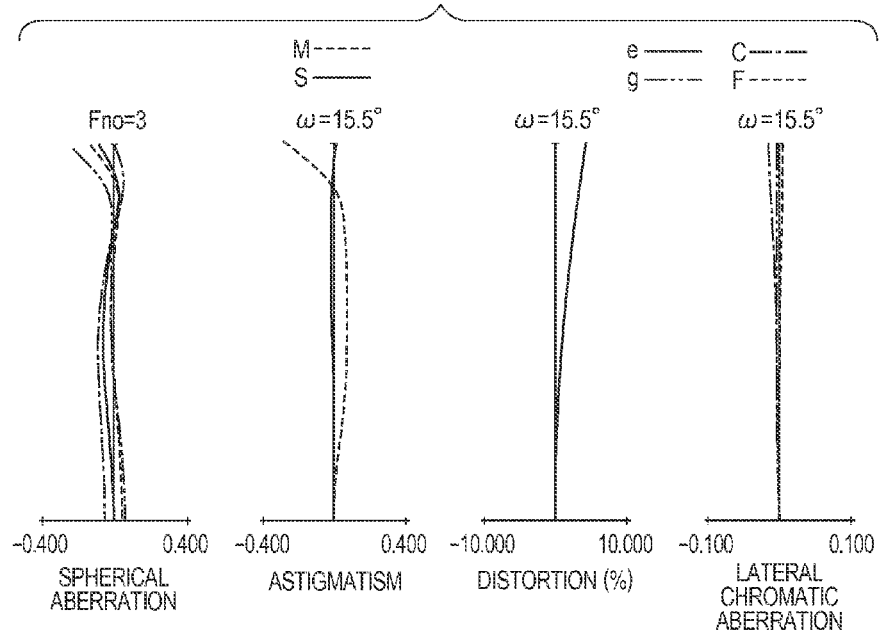
FIG. 10C is an aberration diagram when focusing on an infinite object at the telephoto end according to Numerical Embodiment 5.

FIG. 9 is a lens cross-sectional view of a zoom lens according to Embodiment 5 (Numerical Embodiment 5) of the present invention at a wide angle end (focal length f=14 mm) when focusing on an infinite object. FIGS. 10A, 10B, and 10C are aberration diagrams respectively at the wide angle end, at an intermediate zoom position (focal length f=28.00 mm), and at a telephoto end (focal length f=56.00 mm) when focusing on an infinite object according to Numerical Embodiment 5.

FIG. 11 is a lens cross-sectional view of a zoom lens according to Embodiment 6 (Numerical Embodiment 6) of the present invention at a wide angle end (focal length f=18.50 mm) when focusing on an infinite object. FIGS. 12A, 12B, and 12C are aberration diagrams respectively at the wide angle end, at an intermediate zoom position (focal length f=45.00 mm), and at a telephoto end (focal length f=120.25 mm) when focusing on an infinite object according to Numerical Embodiment 6.

Figure 13:
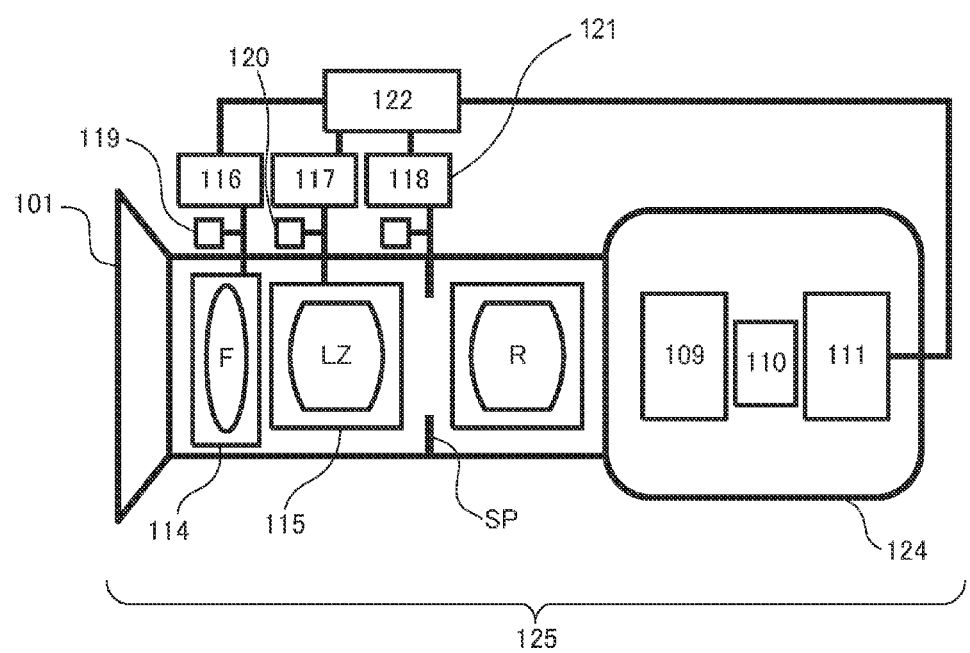
FIG. 13 is a schematic diagram of a main part of an image pickup apparatus of the present invention.

FIG. 13 is a schematic diagram of a main part of an image pickup apparatus of the present invention.

In each lens cross-sectional view, the left side is a subject (object) side (front), and the right side is the image side (rear). In the lens cross-sectional view, a first lens unit (front lens unit) U1 has a positive refractive power and does not move for zooming. A focus lens unit U11 in the first lens unit U1 moves toward the object side when focusing from an infinite object to an object at a close range. A fixed lens unit U12 or U13 in the first lens unit U1 does not move for focusing. In FIGS. 1, 3, 5, 7, and 9 (Embodiments 1 to 5), a second lens unit U2 and a third lens unit U3 each has a negative refractive power and moves during zooming. The two lens units: the second lens unit U2; and the third lens unit U3 are lens units which move during zooming. A fourth lens unit U4 (relay lens unit) has a positive refractive power and an imaging action, and does not move for zooming. In FIG. 11 (Embodiment 6), a second lens unit U2, a third lens unit U3, and a fourth lens unit U4 each have a negative refractive power and moves during zooming. The three lens units: the second lens unit U2; the third lens unit U3; and the fourth lens unit U4 are lens units which move during zooming. In addition, a fifth lens unit U5 (relay lens unit) has a positive refractive power and an imaging action, and does not move for zooming.

A stop (aperture stop) SP is arranged. When used as an image pickup optical system for a broadcasting television camera, a movie camera, a video camera, or a digital still camera, an image pickup surface I corresponds to an image pickup surface of a solid-state image pickup element (photoelectric transducer) or the like for receiving an image formed by the zoom lens and converting light to electricity. When used as an image pickup optical system for a film camera, the image pickup surface I corresponds to a film surface on which the image formed by the zoom lens is exposed.

In the aberration diagrams, a straight line, a two-dot chain line, a dashed line, and a broken line in a spherical aberration indicate an e-line, a g-line, a C-line, and an F-line, respectively. A broken line and a solid line in astigmatism indicate a meridional image plane and a sagittal image plane, respectively. In addition, a two-dot chain line, a dashed line, and a broken line in a lateral chromatic aberration indicate a g-line, a C-line, and an F-line, respectively. Symbol ω represents a half angle of field, and a symbol Fno represents an F number. Note that, in the following embodiments, the case where a lens unit for zooming is located at the shortest focal length side is referred to as "wide angle end", and the case where a lens unit for zooming is located at the longest focal length side is referred to as "telephoto end".

The zoom lens according to each embodiment of the present invention includes, in order from an object side to an image side: a first lens unit U1 having a positive refractive power that does not move for zooming; a second lens unit U2 having a negative refractive power that moves during zooming; and an N-th lens unit UN having a positive refractive power that does not move for zooming, the N-th lens unit being arranged closest to the image side. The first lens unit U1 includes, in order from the object side to the image side: a first sub-lens unit U11 having a negative refractive power that does not move for focusing; a second sub-lens unit U12 having a positive refractive power that moves along an optical axis during focusing; and a third sub-lens unit U13 having a positive refractive power that does not move for focusing. The following conditional expressions are satisfied.

$$1.5 < f1/fw < 3.5 \quad (1)$$

$$-2.70 < \beta nw < -1.45 \quad (2)$$

In the expressions, f1 represents a focal length of the first lens unit U1, fw represents a focal length at a wide angle end of the entire system (zoom lens), and βnw represents a lateral magnification of the N-th lens unit UN at a wide angle end. Here, βnw represents a magnification of the N-th lens unit for a ray from an object which is in focus at wide angle end. That is, any magnification of the N-th lens unit determined based on rays from an object at closest end or at infinity can be set for βnw as long as the object is in focus. For example, a magnification of the N-th lens unit determined based on rays from an object at infinity on which the zoom lens of the present invention focuses at wide angle end can be βnw.

The conditional expression (1) defines a ratio of the focal length of the first lens unit U1 to the focal length at the wide angle end of the first lens unit U1. In the zoom lens of each embodiment, the focal length of the first lens unit U1 is an important factor for achieving both the high optical performance and the reduction in size. By satisfying the conditional expression (1), a height of off-axis ray that passes through the first lens unit U1 at the wide angle end can be defined, and the various aberrations can be satisfactorily corrected while the increase in size of the lens is suppressed.

If the condition of an upper limit of the conditional expression (1) is not satisfied, the refractive power of the first lens unit U1 is reduced, and the height of the off-axis ray that passes through the first lens unit U1 is increased. As a result, the lens is increased in size. On the other hand, if the condition of a lower limit of the conditional expression (1) is not satisfied, the refractive power of the first lens unit U1 is increased. As a result, in particular, a chromatic aberration and the various aberrations on the telephoto side become difficult to correct.

The conditional expression (2) defines a lateral magnification of the N-th lens unit UN. In the zoom lens of each embodiment, in order to suppress an influence on the performance, which is caused by the increase in size and the manufacturing error of the lens, the lateral magnification of the N-th lens unit UN is appropriately set. By satisfying the conditional expression (2), the zoom lens that is superior in manufacturability can be obtained while the increase in size of the lens is suppressed.

If the condition of an upper limit of the conditional expression (2) is not satisfied, the size of each lens before the N-th lens unit UN is increased, and particularly, an effective diameter (an effective aperture) of the first lens unit U1 becomes large. On the other hand, if the condition of a lower limit of the conditional expression (2) is not satisfied, an enlargement ratio of each lens before the N-th lens unit UN is increased. As a result, the correction of the various aberrations, particularly, the correction of the chromatic aberration on the telephoto side becomes difficult. In addition, the influence of the manufacturing error on the performance becomes large, and hence the performance deterioration due to the manufacturing variations becomes large.

It is more preferred to set the numerical value ranges of the conditional expressions (1) and (2) as follows.

$$2.0 < f1/fw < 2.7 \quad (1a)$$

$$-2.40 < \beta nw < -1.55 \quad (2a)$$

By satisfying the conditions described above, according to each embodiment of the present invention, it is possible to provide the zoom lens that is reduced is size and weight for which the aberration correction is satisfactorily carried out over the entire zoom range.

In each embodiment, it is more preferred that the following conditional expressions be satisfied:

$$-1.5 < f11/f1 < -0.9 \quad (3)$$

$$-1.5 < f13/f11 < -0.9 \quad (4)$$

In the expressions, f11 represents a focal length of a first sub-lens unit U11 and f13 represents a focal length of a third sub-lens unit U13.

The conditional expression (3) defines a ratio of the focal length of the first lens unit U1 to the focal length of the first sub-lens unit U11.

If the condition of an upper limit of the conditional expression (3) is not satisfied, the focal length of the first sub-lens unit U11 becomes relatively short. As a result, the suppression of the variation in various off-axis aberrations accompanying the zooming on the wide angle side, particularly, the suppression of distortion and curvature of field becomes difficult. On the other hand, if the condition of a lower limit of the conditional expression (3) is not satisfied, the focal length of the first sub-lens unit U11 becomes relatively long. As a result, the lens diameter of the first lens unit U1 becomes large, and hence the wider angle becomes difficult to attain. In addition, it also becomes difficult to suppress the change in image field caused at the time of the focusing.

The conditional expression (4) defines a ratio of the focal length of the first sub-lens unit U11 to the focal length of the third sub-lens unit U13.

If the condition of an upper limit of the conditional expression (4) is not satisfied, the focal length of the first sub-lens unit U11 becomes relatively long. As a result, a principal point of the first lens unit U1 becomes difficult to approach the image side, the lens diameter of the first lens unit U1 becomes large, and hence the wider angle becomes difficult to attain. On the other hand, if the condition of a lower limit of the conditional expression (4) is not satisfied, the focal length of the first sub-lens unit U11 becomes relatively short. This leads to an increase in the number of lenses of the first sub-lens unit U11, and the lens diameter of the first lens unit U1 becomes large, and hence the wider angle becomes difficult to attain.

In each of Embodiments 1 to 5, it is more preferred that the following conditional expression be satisfied.

$$-3.0 < f1/f2 < -1.5 \quad (5)$$

In the expression, f2 represents a focal length of the second lens unit U2.

The conditional expression (5) defines a ratio of the focal length of the first lens unit U1 to the focal length of the second unit U2.

If the condition of an upper limit of the conditional expression (5) is not satisfied, the focal length of the first lens unit U1 becomes relatively short. As a result, the correction of the various aberrations, particularly, the correction of the chromatic aberration on the telephoto side becomes difficult. In addition, the influence of the manufacturing error on the performance becomes large, and hence the performance deterioration due to the manufacturing variations becomes large.

If the condition of a lower limit of the conditional expression (5) is not satisfied, the focal length of the first lens unit U1 becomes relatively long. As a result, the lens diameter of the first lens unit U1 is enlarged, and hence the wider angle becomes difficult to attain. In addition, it also becomes difficult to suppress the change in image field caused at the time of the focusing.

In Embodiment 6, it is more preferred that the zoom lens include a third lens unit U3 having a negative lens unit that moves during zooming, and the following conditional expression be satisfied.

$$-3.0 < f1/f23 < -1.5 \quad (6)$$

In the expression, f23 represents a combined focal length at a wide angle end of the second lens unit U2 and the third lens unit U3.

The conditional expression (6) defines a ratio of the focal length of the first lens unit U1 to the combined focal length f23 at the wide angle end of the second lens unit U2 and the third lens unit U3.

If the condition of an upper limit of the conditional expression (6) is not satisfied, the focal length of the first lens unit U1 becomes relatively short. As a result, the correction of the various aberrations, particularly, the correction of the chromatic aberration on the telephoto side becomes difficult. In addition, the influence of the manufacturing error on the performance becomes large, and hence the performance deterioration due to the manufacturing variations becomes large.

If the condition of a lower limit of the conditional expression (6) is not satisfied, the focal length of the first lens unit U1 becomes relatively long. As a result, the lens diameter of the first lens unit U1 is enlarged, and hence the wider angle becomes difficult to attain. In addition, it also becomes difficult to suppress the change in image field caused at the time of the focusing.

In each embodiment, it is more preferred that the second lens unit U2 include at least one aspherical surface. When the aspherical surface is applied to a surface having a positive refractive power, the aspherical surface preferably has such a shape that the positive refractive power is increased toward the periphery from the optical axis, while when the aspherical surface is applied to a surface having a negative refractive power, the aspherical surface preferably has such a shape that the negative refractive power is decreased toward the periphery from the optical axis. As a result, the suppression of the various off-axis aberrations on the wide angle side, particularly, the correction of the zoom variation due to the distortion and the curvature of field becomes easy.

It is more preferred to set the numerical value ranges of the conditional expressions (3) to (6) as follows.

$$-1.30 < f11/f1 < -1.10 \quad (3a)$$

$$-1.35 < f13/f11 < -1.10 \quad (4a)$$

$$-2.05 < f1/f2 < -1.60 \quad (5a)$$

$$-2.05 < f1/f23 < -1.60 \quad (6a)$$

Next, features of a lens configuration of each embodiment are described.

In Embodiment 1, the first lens unit U1 corresponds to a first lens surface to a twenty-first lens surface. The second lens unit U2 corresponds to a twenty-second lens surface to a thirty-first lens surface. The third lens unit U3 corresponds to a thirty-second lens surface to a thirty-fourth lens surface. The fourth lens unit U4 corresponds to a thirty-sixth lens surface to a fifty-third lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 1 satisfies all the conditional expressions (1) to (5). Embodiment 1 achieves a wider angle of field having a higher zoom ratio of 10.00 and a field angle of photography (angular field of view) of 81.65° at the wide angle end. Further, in the entire zoom range, high optical performance is obtained in which various aberrations are appropriately corrected.

In Embodiment 2, the first lens unit U1 corresponds to a first lens surface to an eighteenth lens surface. The second lens unit U2 corresponds to a nineteenth lens surface to a twenty-fifth lens surface. The third lens unit U3 corresponds to a twenty-sixth lens surface to a twenty-eighth lens surface.

The fourth lens unit U4 corresponds to a thirtieth lens surface to a forty-eighth lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 2 satisfies all the conditional expressions (1) to (5). Embodiment 2 achieves a wider angle of field having a higher zoom ratio of 5.00 and a field angle of photography (angular field of view) of 92.06° at the wide angle end. Further, in the entire zoom range, high optical performance is obtained in which various aberrations are appropriately corrected.

In Embodiment 3, the first lens unit U1 corresponds to a first lens surface to an eighteenth lens surface. The second lens unit U2 corresponds to a nineteenth lens surface to a twenty-seventh lens surface. The third lens unit U3 corresponds to a twenty-eighth lens surface to a thirtieth lens surface. The fourth lens unit U4 corresponds to a thirty-second lens surface to a fifty-first lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 3 satisfies all the conditional expressions (1) to (5). Embodiment 3 achieves a wider angle of field having a higher zoom ratio of 8.00 and a field angle of photography (angular field of view) of 75.73° at the wide angle end. Further, in the entire zoom range, high optical performance is obtained in which various aberrations are appropriately corrected.

In Embodiment 4, the first lens unit U1 corresponds to a first lens surface to a fifteenth lens surface. The second lens unit U2 corresponds to a sixteenth lens surface to a twenty-third lens surface. The third lens unit U3 corresponds to a twenty-fourth lens surface to a twenty-sixth lens surface. The fourth lens unit U4 corresponds to a twenty-eighth lens surface to a forty-fifth lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 4 satisfies all the conditional expressions (1) to (5). Embodiment 4 achieves a wider angle of field having a higher zoom ratio of 5.00 and a field angle of photography (angular field of view) of 78.60° at the wide angle end. Further, in the entire zoom range, high optical performance is obtained in which various aberrations are appropriately corrected.

In Embodiment 5, the first lens unit U1 corresponds to a first lens surface to a nineteenth lens surface. The second lens unit U2 corresponds to a twentieth lens surface to a twenty-seventh lens surface. The third lens unit U3 corresponds to a twenty-eighth lens surface to a thirtieth lens surface. The fourth lens unit U4 corresponds to a thirty-second lens surface to a forty-eighth lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 5 satisfies all the conditional expressions (1) to (5). Embodiment 5 achieves a wider angle of field having a higher zoom ratio of 4.00 and a field angle of photography (angular field of view) of 96.00° at the wide angle end. Further, in the entire zoom range, high optical performance is obtained in which various aberrations are appropriately corrected.

In Embodiment 6, the first lens unit U1 corresponds to a first lens surface to a twenty-first lens surface. The second lens unit U2 corresponds to a twenty-second lens surface to a twenty-sixth lens surface. The third lens unit U3 corresponds to a twenty-seventh lens surface to a thirtieth lens surface. The fourth lens unit U4 corresponds to a thirty-first lens surface to a thirty-third lens surface. The fifth lens unit U5 corresponds to a thirty-fifth lens surface to a fifty-second lens surface.

During the zooming from the wide angle end to the telephoto end, when the second lens unit U2 linearly moves to the image side, the third lens unit U3 also moves substantially linearly to the image side. The second lens unit U2 and the third lens unit U3 move in such a direction that an interval between the second lens unit U2 and the third lens unit U3 increases during the zooming from the wide angle end to the telephoto end. In addition, the fourth lens unit U4 substantially linearly reciprocates while drawing a convex locus on the object side.

As shown in Table 1 below, Numerical Embodiment 6 satisfies all the conditional expressions (1) to (4) and (6). Embodiment 6 achieves a wider angle of field having a higher zoom ratio of 6.50 and a field angle of photography (angular field of view) of 80.10° at the wide angle end. Further, in the entire zoom range, high optical performance is obtained in which various aberrations are appropriately corrected.

As described above, according to each embodiment, the refractive power arrangement of each lens unit, the movement locus of the moving lens unit for zooming, and the like are appropriately defined. Thus, it is possible to obtain the zoom lens having a higher zoom ratio and a wider angle of field, in which various aberrations are appropriately corrected.

FIG. 13 is a schematic diagram of a main part of an image pickup apparatus (TV camera system) employing the zoom lens of Embodiments 1 to 6 as an imaging optical system. FIG. 13 illustrates a zoom lens 101 according to any one of Embodiments 1 to 6 and a camera 124. The zoom lens 101 can be mounted into and removed from the camera 124. The zoom lens 101 is mounted into the camera 124 to form an image pickup apparatus 125. The zoom lens 101 includes a first lens unit F, a zoom section LZ, and an N-th lens unit R for image formation. The first lens unit U1F includes a focus lens unit. The first lens unit F includes a lens unit U12 for focusing that moves on the optical axis during the focusing, and a lens unit U11 that does not move for focusing.

The zoom section LZ includes a second lens unit U2 and a third lens unit U3 that move on the optical axis during zooming in each of Embodiments 1 to 6, and an N-th lens unit U4 closest to the image side that does not move for zooming. The zoom lens 101 also includes an aperture stop SP, and driving mechanisms 114 and 115, such as helicoids and cams, for driving in the optical axis direction the second sub-lens unit U12 and the zoom section LZ, respectively.

The image pickup apparatus 125 includes motors (driving units) 116 to 118 for electrically driving the driving mechanisms 114 and 115 and the aperture stop SP. The image pickup apparatus 125 also includes detectors 119 to 121, such as an encoder, a potentiometer, or a photo-sensor, which are configured to detect the positions of the second sub-lens unit U12 and the zoom section LZ on the optical axis, and the aperture diameter of the aperture stop SP. In addition, the camera 124 includes a glass block 109, which corresponds to an optical filter inside the camera 124. Further, the camera 124 includes a solid-state image pickup element (photoelectric transducer) 110, such as a charge-coupled device (CCD) sensor or a complementary metal-oxide semiconductor (CMOS) sensor.

The solid-state image pickup element 110 is configured to receive an object image formed by the zoom lens 101.

Further, central processing units (CPUs) 111 and 122 control various types of driving of the camera 124 and the zoom lens 101, respectively. Through application of the zoom lens according to the present invention to a TV camera as described above, an image pickup apparatus having high optical performance is implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Now, Numerical Embodiments 1 to 6, corresponding to Embodiments 1 to 6 of the present invention, are described. In each of Numerical Embodiments, i represents an order of a surface from the object side, ri represents a curvature radius of an i-th surface from the object side, di represents an interval between the i-th surface and the (i+1)th surface from the object side, and ndi and vdi respectively represent a refractive index and an Abbe constant of the i-th optical member. An aspherical surface is represented by "*" next to the surface number. Table 1 shows correspondences between each embodiment and the conditional expressions described above.

The aspherical shape is expressed by the following expression:

$$X = \frac{H^2/R}{1 + \sqrt{1 - (1+k)(H/R)^2}} + A4H^4 +$$

-continued $$A6H^6 + A8H^8 + A10H^{10} + A12H^{12} + A14H^{14} + A16H^{16}$$

where an X axis corresponds to the optical axis, an H axis corresponds to an axis perpendicular to the optical axis, a traveling direction of light corresponds to a positive direction, R represents a paraxial curvature radius, k represents a conic constant, A4, A6, A8, A10, A12, A14, and A16 each represent an aspherical coefficient, and "e-Z" means "×10$^{-Z}$".

In each of Embodiments 1 to 5, two lens units move during the zooming, and hence when the movement locus of one lens unit is determined, the movement locus of the other lens unit is also determined. However, in Embodiment 6, three lens units move during the zooming, and hence even when the movement locus of one lens unit is determined, the movement loci of the other two lens units cannot be uniquely determined. Therefore, Embodiment 6 shows the movement loci of the second lens unit and the third lens unit.

The movement locus is expressed by the following expression:

$$fj(y) = Bj1y + Bj2y^2 + Bj3y^3 + Bj4y^4 + Bj5y^5 + Bj6y^6$$

where j represents a number of a lens unit, fj(y) represents a movement amount in the optical axis direction, a traveling direction of light corresponds to a positive direction, y represents the amount of movement from the wide angle end to the telephoto end as 1, and Bj1, Bj2, Bj3, Bj4, Bj5, and Bj6 represent movement coefficients, respectively.

Numerical Embodiment 1

| | | | | Unit mm | | | | |
|---|---|---|---|---|---|---|---|---|
| | | | | Surface data | | | | |
| Surface Number | r | d | nd | vd | θgF | Effective diameter | Focal length |
|---|---|---|---|---|---|---|---|
| 1* | 107.07477 | 3.50000 | 1.772499 | 49.60 | 0.5521 | 94.999 | −94.002 |
| 2 | 42.77453 | 29.44657 | | | | 74.747 | |
| 3 | −111.18408 | 2.00000 | 1.772499 | 49.60 | 0.5521 | 74.020 | −86.187 |
| 4 | 169.27879 | 0.19853 | | | | 73.831 | |
| 5 | 111.15261 | 6.53424 | 1.959060 | 17.47 | 0.6599 | 74.684 | 162.844 |
| 6 | 362.57244 | 4.83576 | | | | 74.310 | |
| 7* | 402.11683 | 9.52789 | 1.620411 | 60.29 | 0.5426 | 73.646 | 143.795 |
| 8 | −114.18218 | 7.22051 | | | | 73.330 | |
| 9 | 273.53589 | 11.14023 | 1.496999 | 81.54 | 0.5374 | 67.740 | 131.565 |
| 10 | −85.09102 | 1.32713 | | | | 67.551 | |
| 11 | −74.32274 | 2.00000 | 1.805181 | 25.42 | 0.6161 | 67.398 | −164.470 |
| 12 | −169.44313 | 1.00002 | | | | 68.351 | |
| 13 | 2516.57481 | 1.80000 | 1.850259 | 32.27 | 0.5929 | 68.012 | −98.133 |
| 14 | 81.30733 | 11.18444 | 1.438750 | 94.93 | 0.5343 | 67.555 | 149.790 |
| 15 | −332.76941 | 0.20010 | | | | 67.981 | |
| 16 | 7491.62170 | 5.08975 | 1.496999 | 81.54 | 0.5374 | 68.578 | 390.027 |
| 17 | −199.54524 | 0.20000 | | | | 69.118 | |
| 18 | 1595.58460 | 5.39098 | 1.595220 | 67.74 | 0.5442 | 69.947 | 305.715 |
| 19 | −205.94799 | 0.20000 | | | | 70.201 | |
| 20 | 216.17076 | 10.28079 | 1.730000 | 49.00 | 0.5575 | 70.182 | 104.355 |
| 21 | −116.13168 | (Variable) | | | | 69.897 | |
| 22* | 50.60782 | 1.00000 | 1.882997 | 40.76 | 0.5667 | 31.807 | −41.311 |
| 23 | 21.07209 | 6.61768 | | | | 27.724 | |
| 24 | −79.54129 | 1.00000 | 1.754998 | 52.32 | 0.5476 | 27.582 | −47.508 |
| 25 | 66.22801 | 0.99806 | | | | 26.863 | |
| 26 | 48.90892 | 4.02300 | 1.882210 | 23.78 | 0.6036 | 26.802 | 40.333 |
| 27 | −130.21404 | 1.94929 | | | | 26.376 | |
| 28 | −37.12529 | 1.00000 | 1.618000 | 63.33 | 0.5441 | 26.194 | −55.128 |
| 29 | 438.13751 | 0.20000 | | | | 25.725 | |
| 30 | 34.72260 | 1.88615 | 1.613397 | 44.30 | 0.5633 | 25.302 | 287.073 |
| 31 | 42.29949 | (Variable) | | | | 24.769 | |

-continued

Unit mm

| | | | | | | | |
|---|---|---|---|---|---|---|---|
| 32 | −46.20252 | 1.00000 | 1.696797 | 55.53 | 0.5433 | 22.167 | −45.199 |
| 33 | 101.17257 | 2.21450 | 1.808095 | 22.76 | 0.6307 | 23.128 | 112.579 |
| 34 | −994.45522 | (Variable) | | | | 23.547 | |
| 35 (Stop) | ∞ | 1.29695 | | | | 28.883 | |
| 36 | 143.50842 | 4.48049 | 1.816000 | 46.62 | 0.5568 | 29.930 | 47.136 |
| 37 | −52.16988 | 0.20000 | | | | 30.182 | |
| 38 | −52.13637 | 6.23615 | 1.487490 | 70.23 | 0.5300 | 29.349 | 48.593 |
| 39 | −41.96851 | 1.20000 | 2.000690 | 25.46 | 0.6133 | 28.856 | −39.407 |
| 40 | 781.32347 | 0.19891 | | | | 28.725 | |
| 41 | 22.82507 | 9.56381 | 1.516330 | 64.14 | 0.5352 | 28.572 | 29.895 |
| 42 | −41.33452 | 1.00000 | 1.834000 | 37.16 | 0.5775 | 27.399 | −26.832 |
| 43 | 50.02430 | 6.99907 | | | | 25.923 | |
| 44 | 386.69864 | 3.99920 | 1.487490 | 70.23 | 0.5300 | 25.416 | 67.610 |
| 45 | −36.04126 | 1.08491 | | | | 25.291 | |
| 46 | 34.86509 | 4.96949 | 1.922860 | 20.88 | 0.6282 | 22.498 | 20.574 |
| 47 | −39.79509 | 0.90000 | 1.882997 | 40.76 | 0.5667 | 21.517 | −18.496 |
| 48 | 28.27246 | 8.88270 | | | | 18.955 | |
| 49 | 37.01797 | 4.62848 | 1.438750 | 94.93 | 0.5343 | 16.005 | 25.301 |
| 50 | −15.30482 | 1.00000 | 1.953750 | 32.32 | 0.5898 | 15.736 | −12.619 |
| 51 | 60.19086 | 2.75426 | | | | 16.455 | |
| 52 | 45.70173 | 3.00473 | 1.620411 | 60.23 | 0.5426 | 18.630 | 48.353 |
| 53 | −86.09140 | 50.07000 | | | | 18.983 | |
| Image plane | ∞ | | | | | | |

Aspherical surface data

First surface

K = 1.92497e+000 A4 = 1.92902e−009 A6 = 6.26259e−011 A8 = −9.53828e−014
A10 = 6.21216e−017 A12 = −2.17747e−020 A14 = 3.29927e−024 A16 = −2.10130e−028

Seventh surface

K = −2.29488e+001 A4 = −4.72874e−007 A6 = 4.95024e−011 A8 = 4.20753e−014
A10 = −7.75550e−017 A12 = 9.10273e−020 A14 = −5.11370e−023 A16 = 1.17437e−026

Twenty-second surface

K = 5.48442e−001 A4 = 1.59884e−007 A6 = −3.77659e−009 A8 = 1.79255e−011
A10 = − 4.48568e−014 A12 = −3.70888e−016 A14 = 2.09083e−018 A16 = −2.91328e−021

Various data
Zoom ratio 10.00

| | Wide angle | Intermediate | Telephoto |
|---|---|---|---|
| Focal length | 18.00 | 63.00 | 180.00 |
| F number | 4.00 | 4.00 | 4.95 |
| Half angle of field | 40.82 | 13.86 | 4.94 |
| Image height | 15.55 | 15.55 | 15.55 |
| Total lens length | 320.10 | 320.10 | 320.10 |
| BF | 50.07 | 50.07 | 50.07 |
| d21 | 0.70 | 45.74 | 65.06 |
| d31 | 60.47 | 8.62 | 6.48 |
| d34 | 11.50 | 18.30 | 1.12 |
| Entrance pupil position | 57.50 | 105.61 | 175.05 |
| Exit pupil position | −33.80 | −33.80 | −33.80 |
| Front principal point position | 71.63 | 121.28 | −31.27 |
| Rear principal point position | 32.07 | −12.93 | −129.93 |

Zoom lens unit data

| Unit | First surface | Focal length | Lens structure length | Front principal point position | Rear principal point position |
|---|---|---|---|---|---|
| 1 | 1 | 57.00 | 113.08 | 71.51 | 43.38 |
| 2 | 22 | −26.70 | 18.67 | 3.98 | −9.70 |
| 3 | 32 | −76.10 | 3.21 | −0.16 | −1.98 |
| 4 | 35 | 31.05 | 62.40 | −11.09 | −41.97 |

Numerical Embodiment 2

| | | | Unit mm | | | | |
|---|---|---|---|---|---|---|---|
| | | | Surface data | | | | |

| Surface Number | r | d | nd | vd | θgF | Effective diameter | Focal length |
|---|---|---|---|---|---|---|---|
| 1* | 86.96069 | 2.80000 | 1.772499 | 49.60 | 0.5521 | 99.506 | −85.846 |
| 2 | 37.19554 | 28.65314 | | | | 72.568 | |
| 3 | 287.18991 | 2.20000 | 1.772499 | 49.60 | 0.5521 | 71.378 | −151.018 |
| 4 | 82.96532 | 9.79457 | | | | 68.012 | |
| 5 | 233.30951 | 2.20000 | 1.772499 | 49.60 | 0.5521 | 67.303 | −81.001 |
| 6 | 49.32285 | 9.90654 | 1.922860 | 18.90 | 0.6495 | 64.827 | 83.114 |
| 7 | 122.07948 | 4.11145 | | | | 64.165 | |
| 8 | 174.57379 | 7.40358 | 1.496999 | 81.54 | 0.5374 | 63.832 | 170.294 |
| 9* | −162.88781 | 10.55549 | | | | 63.329 | |
| 10 | 219.22560 | 11.10101 | 1.618000 | 63.33 | 0.5441 | 61.797 | 87.081 |
| 11 | −70.29224 | 0.51997 | | | | 61.501 | |
| 12 | −90.66362 | 2.00000 | 1.805181 | 25.42 | 0.6161 | 58.344 | −51.316 |
| 13 | 77.98219 | 9.18481 | 1.496999 | 81.54 | 0.5374 | 56.765 | 117.857 |
| 14 | −228.82556 | 0.21692 | | | | 57.161 | |
| 15 | 229.51464 | 10.00000 | 1.595220 | 67.74 | 0.5442 | 57.792 | 89.884 |
| 16 | −68.94195 | 0.20000 | | | | 57.805 | |
| 17 | 57.54531 | 5.56934 | 1.730000 | 49.00 | 0.5575 | 50.901 | 114.868 |
| 18 | 174.06610 | (Variable) | | | | 50.045 | |
| 19* | 222.99988 | 1.30000 | 1.772499 | 49.60 | 0.5521 | 29.397 | −31.652 |
| 20 | 22.07423 | 8.73811 | | | | 24.622 | |
| 21 | −46.00024 | 0.90000 | 1.772499 | 49.60 | 0.5521 | 21.288 | −21.359 |
| 22 | 26.14240 | 4.04203 | 1.846660 | 23.78 | 0.6034 | 21.985 | 24.438 |
| 23 | −96.70044 | 2.91044 | | | | 22.088 | |
| 24 | −20.39226 | 0.90000 | 1.800999 | 34.97 | 0.5863 | 22.088 | −89.160 |
| 25 | −29.02640 | (Variable) | | | | 23.053 | |
| 26 | −33.53567 | 0.90000 | 1.729157 | 54.68 | 0.5444 | 23.727 | −29.601 |
| 27 | 62.00299 | 2.73134 | 1.846660 | 23.78 | 0.6205 | 25.908 | 73.336 |
| 28 | 5426.95120 | (Variable) | | | | 26.494 | |
| 29 (Stop) | ∞ | 1.04258 | | | | 27.557 | |
| 30 | 144.60763 | 5.80564 | 1.834807 | 42.71 | 0.5642 | 29.049 | 38.100 |
| 31 | −40.31316 | 0.20000 | | | | 29.778 | |
| 32 | 140.01330 | 2.90947 | 1.570989 | 50.80 | 0.5588 | 29.573 | 116.796 |
| 33 | −127.51474 | 0.20000 | | | | 29.431 | |
| 34 | 62.82013 | 7.44444 | 1.496999 | 81.54 | 0.5374 | 28.583 | 43.611 |
| 35 | −31.93064 | 1.20000 | 2.000690 | 25.46 | 0.6133 | 27.614 | −30.706 |
| 36 | 1097.65571 | 0.20000 | | | | 27.561 | |
| 37 | 27.33320 | 3.43062 | 1.531717 | 48.84 | 0.5630 | 27.568 | 130.948 |
| 38 | 42.83669 | 17.98679 | | | | 26.842 | |
| 39 | −77.25420 | 4.44564 | 1.487490 | 70.23 | 0.5300 | 23.060 | 306.323 |
| 40 | −51.93660 | 20.78154 | | | | 22.786 | |
| 41 | 72.70183 | 7.72582 | 1.487490 | 70.23 | 0.5300 | 25.172 | 30.867 |
| 42 | −18.39119 | 0.85000 | 1.953750 | 32.32 | 0.5898 | 25.094 | −21.994 |
| 43 | −145.10189 | 2.61020 | | | | 27.091 | |
| 44 | 837.85153 | 6.19253 | 2.102050 | 16.77 | 0.6721 | 29.071 | 32.378 |
| 45 | −37.66305 | 0.85000 | 2.000690 | 25.46 | 0.6133 | 29.817 | −28.178 |
| 46 | 136.96902 | 0.19086 | | | | 30.863 | |
| 47 | 42.04543 | 7.61002 | 1.487490 | 70.23 | 0.5300 | 32.756 | 52.334 |
| 48 | −61.55333 | 33.54000 | | | | 33.050 | |
| Image plane | ∞ | | | | | | |

Aspherical surface data

First surface

K = 1.16599e+000 A4 = 2.14949e−007 A6 = −3.885348−011 A8 = 1.50332e−014

Ninth surface

K = −9.49193e+000 A4 = 5.68085e−007 A6 = 2.51185e−010 A8 = 5.19688e−014

Nineteenth surface

K = −4.37435e+002 A4 = 1.00143e−005 A6 = −1.61464e−008 A8 = 2.99969e−011

Various data
Zoom ratio 5.00

| | Wide angle | Intermediate | Telephoto |
|---|---|---|---|
| Focal length | 15.00 | 35.00 | 75.00 |
| F number | 3.00 | 3.00 | 3.00 |
| Half angle of field | 46.03 | 23.96 | 11.71 |

-continued

| Unit mm | | | |
|---|---|---|---|
| Image height | 15.55 | 15.55 | 15.55 |
| Total lens length | 300.20 | 300.20 | 300.20 |
| BF | 33.54 | 33.54 | 33.54 |
| d18 | 0.99 | 21.34 | 32.89 |
| d25 | 32.46 | 9.59 | 1.98 |
| d28 | 2.70 | 5.23 | 1.28 |
| Entrance pupil position | 50.74 | 66.16 | 86.04 |
| Exit pupil position | −158.40 | −158.40 | −158.40 |
| Front principal point position | 64.57 | 94.78 | 131.73 |
| Rear principal point position | 18.54 | −1.46 | −41.46 |

| Zoom lens unit data | | | | | |
|---|---|---|---|---|---|
| Unit | First surface | Focal length | Lens structure length | Front principal point position | Rear principal point position |
| 1 | 1 | 32.00 | 116.42 | 59.75 | 30.90 |
| 2 | 19 | −18.80 | 18.79 | 3.92 | −10.58 |
| 3 | 26 | −50.00 | 3.63 | −0.04 | −2.03 |
| 4 | 29 | 40.41 | 91.68 | 23.49 | −102.31 |

Numerical Embodiment 3

| Unit mm | | | | | | |
|---|---|---|---|---|---|---|
| Surface data | | | | | | |
| Surface Number | r | d | nd | vd | θgF | Effective diameter | Focal length |
|---|---|---|---|---|---|---|---|
| 1 | 1169.97001 | 3.20000 | 1.772499 | 49.60 | 0.5521 | 96.196 | −86.637 |
| 2 | 63.51741 | 23.65253 | | | | 81.952 | |
| 3 | −120.65898 | 2.70000 | 1.772499 | 49.60 | 0.5521 | 81.536 | −153.974 |
| 4 | 12736.29646 | 0.19644 | | | | 83.190 | |
| 5 | 137.03668 | 5.93946 | 1.922860 | 20.88 | 0.6282 | 85.308 | 253.532 |
| 6 | 318.82080 | 1.99862 | | | | 84.987 | |
| 7 | 271.65559 | 14.52319 | 1.620411 | 60.29 | 0.5426 | 84.829 | 126.774 |
| 8* | −109.03750 | 0.19636 | | | | 84.334 | |
| 9 | 1217.78701 | 11.61409 | 1.496999 | 81.54 | 0.5374 | 78.550 | 168.129 |
| 10 | −89.71276 | 2.50000 | 1.800000 | 29.84 | 0.6017 | 78.057 | −155.348 |
| 11 | −320.04558 | 7.41270 | | | | 77.803 | |
| 12 | 112.52390 | 2.50000 | 1.737999 | 32.26 | 0.5899 | 76.449 | −159.641 |
| 13 | 57.21267 | 18.30702 | 1.496999 | 81.54 | 0.5374 | 73.743 | 97.085 |
| 14 | −280.48528 | 0.20000 | | | | 73.551 | |
| 15 | 101.84132 | 9.22993 | 1.537150 | 74.81 | 0.5390 | 71.243 | 165.923 |
| 16 | −709.19180 | 0.20000 | | | | 70.430 | |
| 17 | 83.33061 | 5.90316 | 1.790000 | 45.50 | 0.5720 | 64.795 | 195.921 |
| 18 | 173.80844 | (Variable) | | | | 63.045 | |
| 19* | 61.54916 | 1.20000 | 1.882997 | 40.76 | 0.5667 | 29.211 | −28.504 |
| 20 | 17.77319 | 5.41316 | | | | 24.205 | |
| 21 | −159.39579 | 4.20515 | 1.846660 | 23.78 | 0.6034 | 24.051 | 32.622 |
| 22 | −24.02808 | 0.70000 | 1.772499 | 49.60 | 0.5521 | 23.552 | −36.395 |
| 23 | −162.83076 | 2.58431 | | | | 22.313 | |
| 24 | −23.84544 | 0.70000 | 1.729157 | 54.68 | 0.5444 | 22.322 | −29.063 |
| 25 | 200.55833 | 0.16000 | | | | 24.087 | |
| 26 | 58.45160 | 4.05153 | 1.654115 | 39.70 | 0.5737 | 25.225 | 47.356 |
| 27 | −64.90617 | (Variable) | | | | 25.690 | |
| 28 | −33.60198 | 0.90000 | 1.651597 | 58.55 | 0.5426 | 26.193 | −40.205 |
| 29 | 122.39841 | 2.45535 | 1.808095 | 22.76 | 0.6307 | 28.396 | 116.449 |
| 30 | −422.01783 | (Variable) | | | | 28.992 | |
| 31 (Stop) | ∞ | 1.29499 | | | | 35.175 | |
| 32 | 937.43324 | 4.48116 | 1.754988 | 52.32 | 0.5476 | 36.289 | 74.579 |
| 33 | −60.07159 | 0.20000 | | | | 36.843 | |
| 34 | 68.90268 | 5.17787 | 1.618000 | 63.33 | 0.5441 | 38.045 | 80.550 |
| 35 | −176.59285 | 0.20000 | | | | 37.907 | |
| 36 | 76.80512 | 5.15355 | 1.496999 | 81.54 | 0.5374 | 36.900 | 95.188 |
| 37 | −121.35769 | 1.20000 | 2.001000 | 29.13 | 0.5997 | 36.351 | −94.686 |
| 38 | 451.54241 | 0.19951 | | | | 35.813 | |
| 39 | 43.80046 | 10.46440 | 1.516330 | 64.14 | 0.5352 | 34.809 | 48.610 |
| 40 | −54.46084 | 1.10000 | 1.772499 | 49.60 | 0.5521 | 32.722 | −43.222 |

-continued

Unit mm

| | | | | | | | |
|---|---|---|---|---|---|---|---|
| 41 | 88.14685 | 23.84474 | | | | 31.202 | |
| 42 | 49.48699 | 4.85470 | 1.487490 | 70.23 | 0.5300 | 25.163 | 49.788 |
| 43 | −46.40636 | 0.19996 | | | | 25.061 | |
| 44 | 28.21280 | 5.77563 | 1.487490 | 70.23 | 0.5300 | 23.317 | 34.245 |
| 45 | −38.45968 | 1.00000 | 2.000690 | 25.46 | 0.6133 | 22.489 | −15.479 |
| 46 | 26.68305 | 2.54412 | | | | 21.327 | |
| 47 | 271.15033 | 6.98468 | 1.808095 | 22.76 | 0.6307 | 21.567 | 19.111 |
| 48 | −16.36352 | 1.00000 | 1.882997 | 40.76 | 0.5667 | 22.077 | −17.554 |
| 49 | 339.47363 | 7.60841 | | | | 23.513 | |
| 50 | 35.22725 | 4.97126 | 1.487490 | 70.23 | 0.5300 | 29.657 | 67.719 |
| 51 | −529.25312 | 37.90000 | | | | 29.720 | |
| Image plane | ∞ | | | | | | |

Aspherical surface data

Eighth surface

K = 7.46975e−001 A4 = 1.99891e−007 A6 = 6.90199e−011 A8 = −1.88943e−013
A10 = 2.85379e−016 A12 = −2.31761e−019 A14 = 9.51659e−023 A16 = −1.55553e−026

Nineteenth surface

K = 5.13907e+000 A4 = 1.02312e−006 A6 = −1.14340e−008 A8 = 4.59324e−011
A10 = −3.79212e−013 A12 = 1.38269e−015 A14 = −1.51499e−018 A16 = −1.86650−021

Various data
Zoom ratio 8.00

| | Wide angle | Intermediate | Telephoto |
|---|---|---|---|
| Focal length | 20.00 | 60.00 | 160.00 |
| F number | 2.80 | 2.80 | 3.60 |
| Half angle of field | 37.87 | 14.53 | 5.55 |
| Image height | 15.55 | 15.55 | 15.55 |
| Total lens length | 310.03 | 310.03 | 310.03 |
| BF | 37.90 | 37.90 | 37.90 |
| d18 | 0.69 | 30.37 | 44.35 |
| d27 | 41.14 | 7.95 | 5.96 |
| d30 | 9.40 | 12.91 | 0.93 |
| Entrance pupil position | 59.82 | 110.55 | 190.03 |
| Exit pupil position | −86.03 | −86.03 | −86.03 |
| Front principal point position | 76.59 | 141.50 | 143.45 |
| Rear principal point position | 17.90 | −22.10 | −122.10 |

Zoom lens unit data

| Unit | First surface | Focal length | Lens structure length | Front principal point position | Rear principal point position |
|---|---|---|---|---|---|
| 1 | 1 | 52.10 | 110.27 | 60.89 | 19.92 |
| 2 | 19 | −21.50 | 19.01 | 2.12 | −12.13 |
| 3 | 28 | −62.00 | 3.36 | −0.27 | −2.18 |
| 4 | 31 | 37.40 | 88.25 | 8.75 | −74.61 |

Numerical Embodiment 4

Unit mm

Surface data

| Surface Number | r | d | nd | vd | θgF | Effective diameter | Focal length |
|---|---|---|---|---|---|---|---|
| 1 | 133.81883 | 3.00000 | 1.772499 | 49.60 | 0.5521 | 90.057 | −87.880 |
| 2 | 44.73925 | 23.87215 | | | | 72.971 | |
| 3 | −167.36766 | 2.50000 | 1.772499 | 49.60 | 0.5521 | 72.606 | −93.032 |
| 4 | 127.84286 | 1.91426 | | | | 72.647 | |
| 5 | 102.37636 | 7.51980 | 1.922860 | 20.88 | 0.6282 | 74.470 | 169.653 |
| 6 | 279.42399 | 1.64636 | | | | 74.063 | |
| 7* | 150.90630 | 8.70581 | 1.620411 | 60.29 | 0.5426 | 74.022 | 160.132 |

-continued

| | | | Unit mm | | | | |
|---|---|---|---|---|---|---|---|
| 8 | −207.65662 | 8.66215 | | | | 73.699 | |
| 9 | 164.35762 | 9.37868 | 1.595220 | 67.74 | 0.5442 | 73.882 | 157.795 |
| 10 | −216.26086 | 0.20000 | | | | 73.584 | |
| 11 | 134.40933 | 2.00000 | 1.882210 | 23.78 | 0.6036 | 69.914 | −94.024 |
| 12 | 51.24522 | 16.88046 | 1.438750 | 94.93 | 0.5343 | 65.990 | 98.740 |
| 13 | −256.15857 | 0.20000 | | | | 66.035 | |
| 14 | 86.69121 | 12.31733 | 1.770000 | 54.50 | 0.5550 | 65.245 | 73.671 |
| 15 | −155.91296 | (Variable) | | | | 64.209 | |
| 16* | 42.60200 | 1.20000 | 1.834807 | 42.71 | 0.5642 | 31.339 | −35.032 |
| 17 | 17.17444 | 7.78247 | | | | 25.592 | |
| 18 | −44.84220 | 0.80000 | 1.729157 | 54.68 | 0.5444 | 25.316 | −33.000 |
| 19 | 52.81240 | 1.69099 | | | | 24.142 | |
| 20 | 40.60240 | 3.82252 | 1.846660 | 23.78 | 0.6034 | 23.802 | 36.560 |
| 21 | −129.97366 | 2.63029 | | | | 23.556 | |
| 22 | −24.87045 | 0.90000 | 1.834807 | 42.71 | 0.5642 | 23.531 | −115.791 |
| 23 | −33.97396 | (Variable) | | | | 24.204 | |
| 24 | −27.10392 | 0.80000 | 1.639999 | 60.08 | 0.5370 | 24.578 | −35.634 |
| 25 | 149.20046 | 2.54968 | 1.808095 | 22.76 | 0.6307 | 26.593 | 104.102 |
| 26 | −195.97886 | (Variable) | | | | 27.185 | |
| 27 (Stop) | ∞ | 1.71552 | | | | 28.120 | |
| 28 | −466.88719 | 2.95712 | 1.772499 | 49.60 | 0.5521 | 29.050 | 97.620 |
| 29 | −65.37333 | 0.20000 | | | | 29.600 | |
| 30 | 264.38094 | 4.09823 | 1.589130 | 61.14 | 0.5406 | 30.292 | 77.252 |
| 31 | −54.91610 | 0.20000 | | | | 30.505 | |
| 32 | 72.98468 | 5.78813 | 1.516330 | 64.14 | 0.5352 | 30.050 | 52.941 |
| 33 | −42.77332 | 1.20000 | 2.000690 | 25.46 | 0.6133 | 29.708 | −44.919 |
| 34 | −753.89691 | 0.91730 | | | | 29.782 | |
| 35 | 23.21503 | 3.28414 | 1.516330 | 64.14 | 0.5352 | 29.785 | 178.749 |
| 36 | 41.03538 | 23.25738 | | | | 23.059 | |
| 37 | 64.82994 | 0.90000 | 1.953750 | 32.32 | 0.5898 | 24.567 | −36.795 |
| 38 | 22.72058 | 6.11702 | 1.808095 | 22.76 | 0.6307 | 24.367 | 22.735 |
| 39 | −89.12908 | 1.72046 | | | | 24.427 | |
| 40 | 47.08069 | 5.42141 | 1.438750 | 94.93 | 0.5343 | 23.755 | 43.655 |
| 41 | −31.28624 | 1.00000 | 1.805181 | 25.42 | 0.6161 | 23.307 | −19.730 |
| 42 | 33.35913 | 10.29550 | | | | 23.076 | |
| 43 | 35.83585 | 7.33475 | 1.487490 | 70.23 | 0.5300 | 29.594 | 44.835 |
| 44 | −52.71959 | 1.20000 | 1.834000 | 37.16 | 0.5775 | 29.689 | −130.968 |
| 45 | −102.35803 | 40.04000 | | | | 30.020 | |
| Image plane | ∞ | | | | | | |

Aspherical surface data

Seventh surface

K = −1.31886e+001 A4 = −3.33339e−007 A6 = −1.00548e−011 A8 = 1.93377e−014
A10 = −5.83498e−017 A12 = 1.05163e−013 A14 = −7.28030e−023 A16 = 1.81611e−026
Sixteenth surface K = −6.82246e+000 A4 = 1.53646e−005 A6 = −1.26474e−008 A8 = 3.57838e−011
A10 = −2.67322e−013 A12 = 2.11682e−015 A14 = −7.89376e−018 A16 = 1.19021e−020

Various data
Zoom ratio 5.00

| | Wide angle | Intermediate | Telephoto |
|---|---|---|---|
| Focal length | 19.00 | 45.00 | 95.00 |
| F number | 2.70 | 2.70 | 2.70 |
| Half angle of field | 39.30 | 19.06 | 9.30 |
| Image height | 15.55 | 15.55 | 15.55 |
| Total lens length | 277.64 | 277.64 | 277.64 |
| BF | 40.04 | 40.04 | 40.04 |
| d15 | 0.70 | 22.76 | 34.43 |
| d23 | 28.12 | 6.05 | 3.57 |
| d26 | 10.20 | 10.21 | 1.02 |
| Entrance pupil position | 56.04 | 85.75 | 122.55 |
| Exit pupil position | −103.97 | −103.97 | −103.97 |

-continued

| Unit mm | | | |
|---|---|---|---|
| Front principal point position | 72.53 | 116.69 | 154.88 |
| Rear principal point position | 21.04 | −4.96 | −54.96 |

Zoom lens unit data

|  | First surface | Focal length | Lens structure length | Front principal point position | Rear principal point position |
|---|---|---|---|---|---|
| 1 | 1 | 45.00 | 38.80 | 57.31 | 21.16 |
| 2 | 16 | −24.80 | 18.83 | 2.46 | −13.14 |
| 3 | 24 | −55.00 | 3.35 | −0.46 | −2.37 |
| 4 | 27 | 40.26 | 77.61 | 19.72 | −65.31 |

Numerical Embodiment 5

Unit mm

Surface data

| Surface Number | r | d | nd | vd | θgF | Effective diameter | Focal length |
|---|---|---|---|---|---|---|---|
| 1* | 81.52156 | 2.80000 | 1.772499 | 49.60 | 0.5521 | 97.273 | −83.251 |
| 2 | 35.50574 | 31.30681 |  |  |  | 70.026 |  |
| 3 | 667.71915 | 2.20000 | 1.772499 | 49.60 | 0.5521 | 68.022 | −135.261 |
| 4 | 90.59457 | 4.47839 |  |  |  | 64.610 |  |
| 5 | 197.06072 | 2.20000 | 1.834807 | 42.71 | 0.5642 | 64.321 | −66.614 |
| 6 | 43.33682 | 11.33919 | 1.922860 | 18.90 | 0.6495 | 60.874 | 69.654 |
| 7 | 113.32971 | 2.55719 |  |  |  | 59.842 |  |
| 8 | 115.11681 | 9.51685 | 1.496999 | 81.54 | 0.5374 | 59.385 | 153.156 |
| 9* | −220.41107 | 0.20000 |  |  |  | 58.068 |  |
| 10 | 185.45912 | 9.63439 | 1.618000 | 63.33 | 0.5441 | 57.517 | 91.373 |
| 11 | −80.00592 | 2.00000 | 1.846660 | 23.78 | 0.6205 | 57.026 | −103.318 |
| 12 | −857.68120 | 5.60166 |  |  |  | 56.350 |  |
| 13 | −547.42488 | 2.00000 | 1.846660 | 23.78 | 0.6205 | 55.107 | −95.810 |
| 14 | 96.50030 | 8.54469 | 1.496999 | 81.54 | 0.5374 | 56.048 | 126.294 |
| 15 | −175.74550 | 0.20000 |  |  |  | 56.723 |  |
| 16 | 248.42762 | 12.85098 | 1.595220 | 67.74 | 0.5442 | 58.081 | 80.834 |
| 17 | −58.77230 | 0.20000 |  |  |  | 58.452 |  |
| 18 | 56.55329 | 6.43207 | 1.763850 | 48.51 | 0.5587 | 50.476 | 91.827 |
| 19 | 271.97337 | (Variable) |  |  |  | 49.270 |  |
| 20* | 75.52289 | 1.30000 | 1.816000 | 46.62 | 0.5568 | 27.970 | −25.770 |
| 21 | 16.38581 | 1.94998 |  |  |  | 22.551 |  |
| 22 | −35.35061 | 0.90000 | 1.754998 | 52.32 | 0.5476 | 20.890 | −28.150 |
| 23 | 54.49701 | 0.20000 |  |  |  | 20.318 |  |
| 24 | 38.34698 | 4.04203 | 1.846660 | 23.78 | 0.6034 | 20.314 | 27.246 |
| 25 | −56.47379 | 2.18661 |  |  |  | 19.859 |  |
| 26 | −20.15327 | 0.90000 | 1.882997 | 40.76 | 0.5667 | 19.635 | −76.243 |
| 27 | −29.29552 | (Variable) |  |  |  | 20.447 |  |
| 28 | −28.24173 | 0.90000 | 1.729157 | 54.68 | 0.5444 | 21.748 | −31.883 |
| 29 | 136.58830 | 2.26264 | 1.846660 | 23.78 | 0.6205 | 23.610 | 90.643 |
| 30 | −177.80079 | (Variable) |  |  |  | 24.238 |  |
| 31 (Stop) | ∞ | 1.80831 |  |  |  | 26.366 |  |
| 32 | 1876.46717 | 5.41221 | 1.816000 | 46.62 | 0.5568 | 27.823 | 37.988 |
| 33 | −31.64154 | 0.20000 |  |  |  | 28.604 |  |
| 34 | 60.10061 | 8.24256 | 1.496999 | 81.54 | 0.5374 | 28.186 | 38.709 |
| 35 | −27.12183 | 1.20000 | 2.001000 | 29.13 | 0.5997 | 27.594 | −34.449 |
| 36 | −126.12274 | 0.20000 |  |  |  | 28.202 |  |
| 37 | 27.44643 | 3.25073 | 1.612929 | 37.00 | 0.5862 | 28.528 | 139.096 |
| 38 | 38.53198 | 22.34855 |  |  |  | 27.776 |  |
| 39 | −524.12330 | 5.21590 | 1.517417 | 52.43 | 0.5564 | 24.011 | 121.284 |
| 40 | −56.46271 | 11.54753 |  |  |  | 24.632 |  |
| 41 | 111.79736 | 8.05123 | 1.496999 | 81.54 | 0.5374 | 24.704 | 33.474 |
| 42 | −19.14232 | 0.85000 | 1.953750 | 32.31 | 0.5898 | 24.498 | −25.679 |
| 43 | −87.28015 | 3.16563 |  |  |  | 25.890 |  |
| 44 | 436.69471 | 5.32440 | 1.959060 | 17.47 | 0.6599 | 27.387 | 38.954 |
| 45 | −41.20307 | 0.85000 | 2.001000 | 29.13 | 0.5997 | 27.768 | −24.479 |
| 46 | 62.31899 | 0.38161 |  |  |  | 28.514 |  |

-continued

| | | | Unit mm | | | | |
|---|---|---|---|---|---|---|---|
| 47 | 43.43683 | 7.60385 | 1.496999 | 81.54 | 0.5374 | 29.721 | 43.773 |
| 48 | −41.28677 | 0.00000 | | | | 30.288 | |
| Image plane | ∞ | 41.02000 | | | | | |

Aspherical surface data

First surface

K = 1.15930e+000 A4 = 3.25637e−007 A6 = −7.92964e−012 A8 = 8.93227e−015

Ninth surface

K = −4.96791e+001 A4 = 8.83515e−007 A6 = 5.16367e−010 A8 = 5.70862e−014

Twentieth surface

K = 8.19089e+000 A4 = 5.61681e−006 A6 = −9.29022e−009 A8 = 2.78530e−011

Various data
Zoom ratio 4.00

| | Wide angle | Intermediate | Telephoto |
|---|---|---|---|
| Focal length | 14.00 | 28.00 | 56.00 |
| F number | 3.00 | 3.00 | 3.00 |
| Half angle of field | 48.00 | 29.05 | 15.52 |
| Image height | 15.55 | 15.55 | 15.55 |
| Total lens length | 297.27 | 297.27 | 297.27 |
| BF | 41.02 | 41.02 | 41.02 |
| d19 | 1.00 | 17.72 | 28.94 |
| d27 | 32.19 | 13.50 | 4.68 |
| d30 | 2.70 | 4.67 | 2.27 |
| Entrance pupil position | 48.68 | 60.09 | 76.35 |
| Exit pupil position | −122.20 | −122.20 | −122.20 |
| Front principal point position | 61.48 | 83.29 | 113.13 |
| Rear principal point position | 27.02 | 13.02 | −14.98 |

Zoom lens unit data

| Unit | First surface | Focal Length | Lens structure length | Front principal point position | Rear principal point position |
|---|---|---|---|---|---|
| 1 | 1 | 30.00 | 114.06 | 57.47 | 29.47 |
| 2 | 20 | −19.00 | 17.48 | 2.47 | −11.25 |
| 3 | 28 | −50.00 | 3.16 | −0.44 | −2.20 |
| 4 | 31 | 37.44 | 85.65 | 20.00 | −79.28 |

Numerical Embodiment 6

| | | | Unit mm | | | | |
|---|---|---|---|---|---|---|---|

Surface data

| Surface number | r | d | nd | vd | θgF | Effective diameter | Focal length |
|---|---|---|---|---|---|---|---|
| 1 | 194.96209 | 3.00000 | 1.772499 | 49.60 | 0.5521 | 88.491 | −88.490 |
| 2 | 50.45050 | 23.69207 | | | | 73.351 | |
| 3 | −101.22704 | 2.50000 | 1.772499 | 48.60 | 0.5521 | 72.885 | −111.690 |
| 4 | 610.40944 | 0.19704 | | | | 74.054 | |
| 5 | 112.46576 | 6.06429 | 1.922860 | 18.90 | 0.6495 | 75.732 | 194.404 |
| 6 | 287.65098 | 4.86350 | | | | 75.347 | |
| 7 | −1837.00765 | 7.27013 | 1.651597 | 58.55 | 0.5426 | 75.086 | 230.062 |
| 8 | −139.33725 | 0.20000 | | | | 74.929 | |
| 9 | −472.70380 | 4.65675 | 1.595220 | 67.74 | 0.5442 | 72.970 | 424.413 |
| 10 | −165.62101 | 8.66201 | | | | 72.465 | |
| 11 | −192.35145 | 6.46656 | 1.537150 | 74.81 | 0.5390 | 66.913 | 268.083 |
| 12 | −83.47137 | 0.99766 | | | | 66.556 | |
| 13 | −78.26046 | 2.50000 | 1.800000 | 29.84 | 0.6017 | 66.067 | −270.007 |
| 14 | −123.92169 | 0.20000 | | | | 67.015 | |

-continued

| Unit mm | | | | | | | |
|---|---|---|---|---|---|---|---|
| 15 | 144.80685 | 2.00000 | 1.846660 | 23.78 | 0.6034 | 66.705 | −142.303 |
| 16 | 65.69817 | 13.00429 | 1.496999 | 81.54 | 0.5374 | 65.115 | 106.901 |
| 17 | −263.45069 | 0.20000 | | | | 65.049 | |
| 18 | 131.23177 | 9.46925 | 1.496999 | 81.54 | 0.5374 | 64.015 | 146.867 |
| 19 | −161.59164 | 0.20000 | | | | 63.356 | |
| 20 | 61.37933 | 6.25108 | 1.730000 | 49.00 | 0.5575 | 56.603 | 136.191 |
| 21 | 152.31744 | (Variable) | | | | 55.097 | |
| 22* | 123.35380 | 1.20000 | 1.882997 | 40.76 | 0.5667 | 32.088 | −28.857 |
| 23 | 21.12344 | 6.38054 | | | | 26.928 | |
| 24 | −167.62168 | 4.33940 | 1.846660 | 23.78 | 0.6034 | 26.240 | 54.777 |
| 25 | −37.04472 | 0.80000 | 1.772499 | 49.60 | 0.5521 | 25.538 | −98.748 |
| 26 | −72.37210 | (Variable) | | | | 24.901 | |
| 27 | −25.91341 | 0.80000 | 1.834807 | 42.71 | 0.5642 | 24.536 | −28.139 |
| 28 | 270.81861 | 0.16000 | | | | 24.869 | |
| 29 | 87.77809 | 3.31174 | 1.846660 | 23.78 | 0.6034 | 25.043 | 51.048 |
| 30 | −85.31340 | (Variable) | | | | 25.023 | |
| 31 | −31.89775 | 0.90000 | 1.686797 | 55.53 | 0.5433 | 25.027 | −34.635 |
| 32 | 102.09398 | 2.46844 | 1.808095 | 22.76 | 0.6307 | 27.236 | 92.767 |
| 33 | −290.19380 | (Variable) | | | | 27.788 | |
| 34 (Stop) | ∞ | 1.28219 | | | | 32.549 | |
| 35 | ∞ | 5.00427 | 1.816000 | 46.62 | 0.5568 | 33.538 | 57.344 |
| 36 | −47.02989 | 0.20000 | | | | 34.253 | |
| 37 | 121.66426 | 4.00000 | 1.589130 | 61.14 | 0.5406 | 34.746 | 118.312 |
| 38 | −162.68134 | 0.20000 | | | | 34.670 | |
| 39 | 53.21128 | 7.67575 | 1.496999 | 81.54 | 0.5374 | 33.912 | 52.816 |
| 40 | −49.60645 | 1.20000 | 1.846660 | 23.78 | 0.6205 | 33.197 | −43.964 |
| 41 | 156.92657 | 0.19575 | | | | 32.533 | |
| 42 | 24.49279 | 7.89416 | 1.518229 | 58.90 | 0.5456 | 32.141 | 61.163 |
| 43 | 94.58401 | 1.10000 | 1.772499 | 49.60 | 0.5521 | 30.289 | −78.875 |
| 44 | 36.97714 | 21.17659 | | | | 28.740 | |
| 45 | 55.51715 | 6.46969 | 1.805181 | 25.42 | 0.6161 | 22.663 | 21.616 |
| 46 | −24.35459 | 0.90000 | 1.882997 | 40.76 | 0.5667 | 22.365 | −19.627 |
| 47 | 62.39214 | 8.45794 | | | | 22.051 | |
| 48 | 118.59896 | 6.86089 | 1.438750 | 94.93 | 0.5343 | 23.601 | 34.489 |
| 49 | −17.03788 | 1.00000 | 2.003300 | 28.27 | 0.5980 | 23.707 | −26.491 |
| 50 | −48.53765 | 7.21499 | | | | 25.917 | |
| 51 | 55.89004 | 6.66022 | 1.487490 | 70.23 | 0.5300 | 32.106 | 59.353 |
| 52 | −58.04968 | 39.99000 | | | | 32.395 | |
| Image plane | ∞ | | | | | | |

Aspherical surface data

Twenty-second surface

K = 3.15185e+001 A4 = 3.02637e−006 A6 = −5.86837e−009 A8 = −4.69891e−012

Movement locus data

B21 = 40.35954
B31 = 42.94793 B32 = 3.88703 B33 = −8.43442 B34 = 3.38458 B35 = 0.39726
B36 = 0.38969

Various data
Zoom ratio 6.50

| | Wide angle | Intermediate | Telephoto |
|---|---|---|---|
| Focal length | 18.50 | 45.00 | 120.25 |
| F number | 2.80 | 2.80 | 3.43 |
| Half angle of field | 40.05 | 19.06 | 7.37 |
| Image height | 15.55 | 15.55 | 15.55 |
| Total lens length | 300.07 | 300.07 | 300.07 |
| BF | 39.99 | 39.99 | 39.99 |
| d21 | 0.68 | 25.34 | 41.04 |
| d26 | 2.39 | 4.03 | 4.61 |
| d30 | 39.84 | 10.82 | 3.22 |
| d33 | 6.92 | 9.65 | 0.98 |
| Entrance pupil position | 54.12 | 84.17 | 136.89 |
| Exit pupil position | −165.72 | −165.72 | −165.72 |

-continued

| Unit mm | | | |
|---|---|---|---|
| Front principal point position | 70.96 | 119.33 | 186.85 |
| Rear principal point position | 21.49 | −5.01 | −80.26 |

Zoom lens unit data

| Unit | First surface | Focal length | Lens structure length | Front principal point position | Rear principal point position |
|---|---|---|---|---|---|
| 1 | 1 | 46.00 | 102.40 | 59.41 | 25.26 |
| 2 | 22 | −42.00 | 12.72 | −2.77 | −13.83 |
| 3 | 27 | −67.00 | 4.27 | −1.89 | −4.39 |
| 4 | 31 | −56.00 | 3.37 | −0.33 | −2.23 |
| 5 | 34 | 46.94 | 87.49 | 26.91 | −102.68 |

TABLE 1 values corresponding to conditional expressions in Numerical Examples 1 to 6

| | | Numerical Example 1 | Numerical Example 2 | Numerical Example 3 | Numerical Example 4 | Numerical Example 5 | Numerical Example 6 |
|---|---|---|---|---|---|---|---|
| | Wide angle end focal length fw | 18.00 | 15.00 | 20.00 | 19.00 | 14.00 | 18.50 |
| | Telephoto end focal length | 180.00 | 75.00 | 160.00 | 95.00 | 56.00 | 120.25 |
| | Zoom magnification | 10.00 | 5.00 | 8.00 | 5.00 | 4.00 | 6.50 |
| | f1 | 57.00 | 32.00 | 52.10 | 45.00 | 30.00 | 46.00 |
| | f2 | −26.70 | −18.80 | −21.50 | −24.80 | −19.00 | −42.00 |
| | f3 | −76.10 | −50.00 | −62.00 | −55.00 | 50.00 | −67.00 |
| | f4 | 31.05 | 40.41 | 37.40 | 40.26 | 37.44 | −56.00 |
| | f5 | — | — | — | — | — | 46.94 |
| | f23 | — | — | — | — | — | −22.82 |
| | f11 | −56.03 | −43.99 | −67.42 | −57.14 | −39.10 | −61.80 |
| | f12 | 143.79 | 170.29 | 134.47 | 160.13 | 124.97 | 150.18 |
| | f13 | 73.69 | 49.34 | 68.45 | 55.33 | 45.59 | 60.83 |
| | βnw | −1.96 | −2.36 | −2.01 | −1.62 | −2.22 | −2.04 |
| Conditional expression (1) | f1/fw | 3.17 | 2.13 | 2.61 | 2.37 | 2.14 | 2.49 |
| Conditional expression (2) | βnw | −1.96 | −2.36 | −2.01 | −1.62 | −2.22 | −2.04 |
| Conditional expression (3) | f11/f1 | −0.98 | −1.37 | −1.29 | −1.27 | −1.30 | −1.34 |
| Conditional expression (4) | f13/f11 | −1.32 | −1.12 | −1.02 | −0.97 | −1.17 | −0.98 |
| Conditional expression (5) | f1/f2 | −2.13 | −1.70 | −2.42 | −1.81 | −1.58 | — |
| Conditional expression (6) | f1/f23 | — | — | — | — | — | −2.02 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234390, filed Nov. 12, 2013, which is hereby incorporated by reference herein in its entirety.

What is claimed is:

1. A zoom lens, comprising, in order from an object side to an image side:
 a first lens unit having a positive refractive power that does not move for zooming;
 a second lens unit having a negative refractive power that moves during zooming; and
 an N-th lens unit having a positive refractive power that does not move for zooming, the N-th lens unit being arranged closest to the image side,
 wherein the first lens unit comprises, in order from the object side to the image side:
  a first sub-lens unit having a negative refractive power that does not move for focusing;
  a second sub-lens unit having a positive refractive power that moves during focusing; and
  a third sub-lens unit having a positive refractive power that does not move for focusing, and
 wherein the following conditional expressions are satisfied:

$$1.5 < f1/fw < 3.5; \text{ and}$$

$$-2.70 < \beta nw < -1.45,$$

where f1 represents a focal length of the first lens unit, fw represents a focal length at a wide angle end of the zoom lens, and βnw represents a lateral magnification of the N-th lens unit at a wide angle end.

2. A zoom lens according to claim 1, wherein the following conditional expressions are satisfied:

$$-1.5 < f11/f1 < -0.9; \text{ and}$$

$$-1.5 < f13/f11 < -0.9,$$

where f11 represents a focal length of the first sub-lens unit and f13 represents a focal length of the third sub-lens unit.

3. A zoom lens according to claim 1, wherein the following conditional expression is satisfied:

$$-3.0 < f1/f2 < -1.5,$$

where f2 represents a focal length of the second lens unit.

4. A zoom lens according to claim 1, further comprising a third lens unit disposed between the second lens unit and the N-th lens unit and having a negative refractive power that moves during zooming, wherein the following conditional expression is satisfied:

$$-3.0 < f1/f23 < -1.5,$$

where f23 represents a combined focal length of the second lens unit and the third lens unit at a wide angle end.

5. A zoom lens according to claim 1,
wherein the second lens unit has at least one aspherical surface,
wherein, when the aspherical surface is applied to a surface having a positive refractive power, the surface has such a shape that the positive refractive power is increased toward a periphery from the optical axis, and
wherein, when the aspherical surface is applied to a surface having a negative refractive power, the surface has such a shape that the negative refractive power is decreased toward the periphery from the optical axis.

6. An image pickup apparatus, comprising:
a zoom lens comprising, in order from an object side to an image side:
a first lens unit having a positive refractive power that does not move for zooming;
a second lens unit having a negative refractive power that moves during zooming; and
an N-th lens unit having a positive refractive power that does not move for zooming, the N-th lens unit being arranged closest to the image side,
wherein the first lens unit comprises, in order from the object side to the image side:
a first sub-lens unit having a negative refractive power that does not move for focusing;
a second sub-lens unit having a positive refractive power that moves along an optical axis during focusing; and
a third sub-lens unit having a positive refractive power that does not move for focusing, and
wherein the following conditional expressions are satisfied:

$$1.5 < f1/fw < 3.5; \text{ and}$$

$$-2.70 < \beta nw < -1.45,$$

where f1 represents a focal length of the first lens unit, fw represents a focal length at a wide angle end of the zoom lens, and βnw represents a lateral magnification at a wide angle end of the N-th lens unit when an axial ray enters from infinity in a state of focusing on the infinity; and
a solid-state image pickup element configured to receive an image formed by the zoom lens.

* * * * *